US012776693B2

(12) United States Patent
Fujisue et al.

(10) Patent No.: US 12,776,693 B2
(45) Date of Patent: Oct. 27, 2026

(54) MANUFACTURING METHOD OF STATOR, STATOR OF ELECTRIC MOTOR, ELECTRIC MOTOR, HERMETICALLY SEALED COMPRESSOR, AND REFRIGERATION CYCLE APPARATUS

(71) Applicant: Mitsubishi Electric Corporation, Tokyo (JP)

(72) Inventors: Yoshikazu Fujisue, Tokyo (JP); Toshio Arai, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 160 days.

(21) Appl. No.: 18/856,174

(22) PCT Filed: Jun. 23, 2022

(86) PCT No.: PCT/JP2022/025017
§ 371 (c)(1),
(2) Date: Oct. 11, 2024

(87) PCT Pub. No.: WO2023/248404
PCT Pub. Date: Dec. 28, 2023

(65) Prior Publication Data
US 2025/0253744 A1 Aug. 7, 2025

(51) Int. Cl.
*H02K 15/022* (2025.01)
*F25B 31/02* (2006.01)
(Continued)

(52) U.S. Cl.
CPC ........... *H02K 15/022* (2013.01); *F25B 31/02* (2013.01); *H02K 1/148* (2013.01); *H02K 1/276* (2013.01);
(Continued)

(58) Field of Classification Search
CPC ...... H02K 15/022; H02K 1/148; H02K 1/276; H02K 3/522; H02K 2203/12; H02K 15/095; F25B 31/02; F25B 31/026
See application file for complete search history.

(56) References Cited

U.S. PATENT DOCUMENTS 10,491,057 B2 11/2019 Seki et al.
2010/0066193 A1 3/2010 Noda
(Continued)

FOREIGN PATENT DOCUMENTS

JP 2004-208358 A 7/2004
JP 2010-098938 A 4/2010
(Continued)

OTHER PUBLICATIONS

International Search Report of the International Searching Authority dated Sep. 13, 2022 issued for the corresponding International Application No. PCT/JP2022/025017 (and English translation).
(Continued)

*Primary Examiner* — Jerry-Daryl Fletcher
*Assistant Examiner* — Dario Antonio Deleon
(74) *Attorney, Agent, or Firm* — Posz Law Group, PLC

(57) ABSTRACT

A manufacturing method of a stator includes: performing winding and laying a connecting wire. The performing winding and the laying the connecting wire are alternately repeated. In the performing winding, the winding to be in contact with portions of the insulators that are located opposite to the back yokes is wound such that a distal end of the winding nozzle is caused to pass through an inside of the recessed insulator portion, while the winding led out from the distal end of the winding nozzle is being laid over a stepped portion.

8 Claims, 23 Drawing Sheets

(51) Int. Cl.
*H02K 1/14* (2006.01)
*H02K 1/276* (2022.01)
*H02K 3/52* (2006.01)

(52) U.S. Cl.
CPC ......... *H02K 3/522* (2013.01); *H02K 2203/12* (2013.01)

(56) References Cited

U.S. PATENT DOCUMENTS

2017/0077768 A1 3/2017 Hashimoto et al.
2017/0222528 A1* 8/2017 Tsuchida .............. H02K 1/2766

FOREIGN PATENT DOCUMENTS

KR 2018-0013692 A 2/2018
WO 2014/192076 A1 12/2014

OTHER PUBLICATIONS

Examination Report dated Jun. 24, 2026 issued in corresponding Indian Patent Application No. 202427099649.

* cited by examiner

Comparative Example

MANUFACTURING METHOD OF STATOR, STATOR OF ELECTRIC MOTOR, ELECTRIC MOTOR, HERMETICALLY SEALED COMPRESSOR, AND REFRIGERATION CYCLE APPARATUS

TECHNICAL FIELD

The present disclosure relates to a manufacturing method of a stator, a stator of an electric motor, an electric motor, a hermetically sealed compressor, and a refrigeration cycle apparatus.

BACKGROUND ART

In general, a winding method for a stator of a rotating electric machine has been known. The stator includes an annular yoke including a plurality of laminated yoke pieces that are rotatable to each other, and at the yoke pieces, respective teeth are formed. In the winding method, a winding is wound around these yoke pieces (see, for example, Patent Literature 1). In this winding method for the stator of the rotating electric machine, the annular yoke is deformed into a non-circular shape, for example an elliptical shape, to widen some of gaps between adjacent ones of a plurality of teeth, as compared with the other gaps, to cause a winding to pass through each of the widened gaps and wind the winding around each of the teeth.

CITATION LIST

Patent Literature

Patent Literature 1: Japanese Unexamined Patent Application Publication No. 2010-98938

SUMMARY OF INVENTION

Technical Problem

However, in the winding method for the stator of the rotating electric machine disclosed in Patent Literature 1, the annular yoke is deformed into a non-circular shape to wind a winding around each of the teeth. Therefore, it is not possible to wind a winding around a plurality of adjacent teeth simultaneously using a plurality of winding nozzles.

The present disclosure is applied to solve the above problem, and relates to a manufacturing method of a stator, in which windings are wound around a plurality of adjacent teeth simultaneously using a plurality of winding nozzles, thereby to reduce time required for the winding and reduce the likelihood that a connecting wire will loose and also to a stator of an electric motor, an electric motor, a hermetically sealed compressor, and a refrigeration cycle apparatus.

Solution to Problem

A manufacturing method of a stator according to one embodiment of the present disclosure is a manufacturing method of a stator that includes: a stator core including a plurality of divided cores that are connected annularly and include respective back yokes and teeth, the back yokes being fixed to an inner circumferential surface of a container having a cylindrical shape and extending in a circumferential direction of the container, the teeth protruding inwardly from inner circumferential surfaces of the back yokes in a radial direction; a winding wound around the teeth of the divided cores, and insulators insulating the divided cores from the winding. Each of the insulators includes: an end-face insulating portion covering an end face of an associated one of the divided cores in an axial direction of the container; an inner flange portion projecting in the circumferential direction from an inner-circumferential-side end portion of the end-face insulating portion, and extending in a direction away from the divided core in the axial direction; and an outer flange portion projecting in the circumferential direction from an outer-circumferential-side end portion of the end-face insulating portion, and extending in the axial direction away from the divided core. The outer flange portion has, on an outer circumferential surface of the outer flange portion, a set portion on which a connecting wire extending from the winding is set, and has, on an inner circumferential surface of the outer flange portion, a recessed insulator portion having a recess. The recessed insulator portion has a width in the circumferential direction that is greater than a width of the end-face insulating portion in the circumferential direction, and smaller than a width of the outer flange portion in the circumferential direction. A first end portion is further form the divided core than a second end portion, where the first end portion is one of end portions of the recessed insulator portion that is farther from the divided core in the axial direction than the other end portion, and the second end portion is one of end portions of the inner flange portion that is further from the divided core in the axial direction than the other end portion. A third end portion is closer to the divided core than the second end portion, where the third end portion is the other end portion of the recessed insulator portion that is closer to the divided core in the axial direction than the one end portion of the recessed insulator portion. A stepped portion is provided at a boundary between the third end portion and an inner circumferential surface of the outer flange portion. The manufacturing method includes: performing winding simultaneously on adjacent ones of the teeth, using winding nozzles, after opening one part of a single body into which the divided cores are connected annularly to combine, such that the single body is C-shaped, thereby increasing distances between the teeth; and laying the connecting wire, in the laying the connecting wire, each of the winding nozzles is moved from one of the teeth that is subjected to winding to a subsequent one of the teeth, after the opened part of the single body in which the divided cores are connected is closed such that the single body is circularly shaped and then the wiring nozzle is moved and the connecting wire is laid over the set portion. The performing winding and the laying the connecting wire are alternately repeated. In the performing winding, the winding to be in contact with portions of the insulators that are located opposite to the back yokes is wound such that a distal end of the winding nozzle is caused to pass through an inside of the recessed insulator portion, while the winding led out from the distal end of the winding nozzle is being laid over the stepped portion.

A stator of an electric motor according to another embodiment of the present disclosure is manufactured by the above manufacturing method of a stator.

An electric motor according to still another embodiment of the present disclosure includes: the above stator of an electric motor; and a rotor of an electric motor, the rotor being provided inward of the stator.

A hermetically sealed compressor according to a further embodiment of the present disclosure includes: the above electric motor; a compression mechanism configured to be driven by the electric motor and to compress fluid sucked from outside; and a hermetically sealed container housing the electric motor and the compression mechanism.

A refrigeration cycle apparatus according to a still further embodiment of the present disclosure includes: the above hermetically sealed compressor; an outdoor-side heat exchanger; a pressure reducing device; and an indoor-side heat exchanger.

Advantageous Effects of Invention

In the manufacturing method of a stator according to the above one embodiment of the present disclosure, in the process of performing winding, windings are wound around a plurality of the teeth adjacent to each other simultaneously with the plurality of winding nozzles in a state in which the single body in which the divided cores are connected is opened at one part and is C-shaped, thereby reducing the time required for the winding; and in the process of laying the connecting wire, the connecting wire is laid after the single body including the connected divided cores and opened at the one part are closed to be shaped circularly, thereby reducing the likelihood that the connecting wire will loose. Furthermore, the winding to be in contact with portions of the insulators that are located opposite to the back yoke is wound such that the distal end of the winding nozzle is made to pass through the inside of the recessed insulator portion, while the winding led out from the distal end of the winding nozzle is being laid over the stepped portion. Thus, it is possible to bring the winding into tight contact with the portions of the insulators that are located opposite to the back yoke, and improve the winding density.

DESCRIPTION OF EMBODIMENTS

Figure 1:
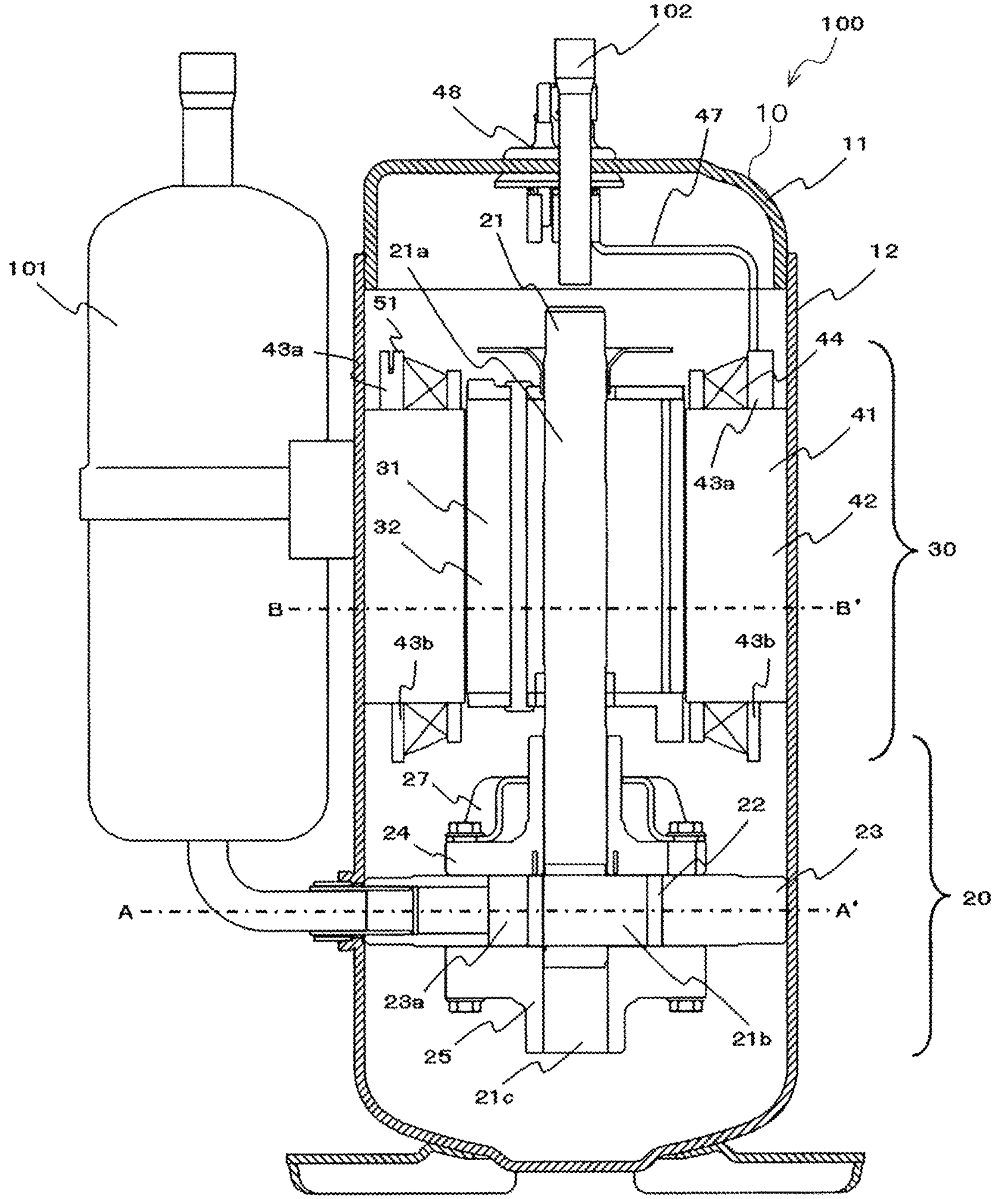
FIG. 1 is a sectional view of a hermetically sealed compressor according to Embodiment 1.

Embodiments of the present disclosure will be described with reference to the drawings. It should be noted that the present disclosure is not limited by the embodiment described below. In addition, in the drawings, the relationship in size between components may differ from an actual one.

Embodiment 1

Figure 2:
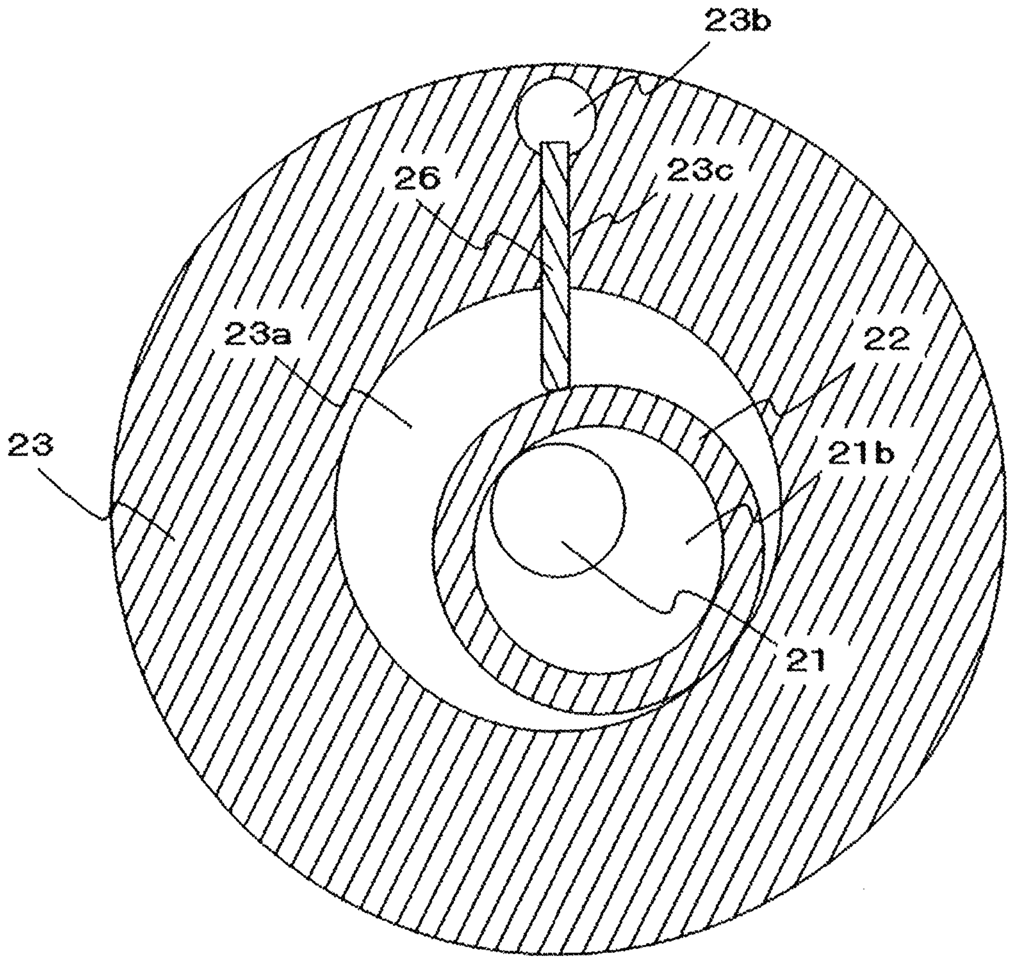
FIG. 2 is a cross-sectional view of the hermetically sealed compressor taken along the A-A' line in FIG. 1, as viewed from above.

FIG. 1 is a sectional view of a hermetically sealed compressor 100 according to Embodiment 1. FIG. 2 is a cross-sectional view of the hermetically sealed compressor 100 that is taken along line A-A' in FIG. 1, as viewed from above. Regarding Embodiment 1, a single-cylinder rotary compressor will be described below as an example of the hermetically sealed compressor 100.

As illustrated in FIG. 1, in the hermetically sealed compressor 100 according to Embodiment 1, a compression mechanism 20 and an electric motor 30 are housed in a cylindrical hermetically sealed container 10. The compression mechanism 20 is configured to compress refrigerant gas. The electric motor 30 is configured to drive the compression mechanism 20. The hermetically sealed container 10 is made up of an upper container 11 and a lower container 12. The compression mechanism 20 is provided in a lower portion of the hermetically sealed container 10, and the electric motor 30 is provided in an upper portion of the hermetically sealed container 10. The compression mechanism 20 and the electric motor 30 are connected by a rotation shaft 21. The rotation shaft 21 transmits rotational motion of the electric motor 30 to the compression mechanism 20. In the compression mechanism 20, refrigerant gas is compressed by a transmitted rotational force, and then discharged to the interior of the hermetically sealed container 10. The interior of the hermetically sealed container 10 is filled with high-temperature and high-pressure refrigerant gas obtained through compression. In the lower portion of the hermetically sealed container 10, that is, at the bottom portion thereof, refrigerating machine oil is stored for lubrication of the compression mechanism 20. At a lower portion of the rotation shaft 21, an oil pump (not illustrated) is provided. As the rotation shaft 21 rotates, the oil pump pumps up the refrigerating machine oil stored in the bottom portion of the hermetically sealed container 10, and supplies the refrigerating machine oil to sliding parts of the compression mechanism 20, thereby ensuring a mechanical lubricating action of the compression mechanism 20. At an upper portion of the hermetically sealed container 10, a glass terminal 48 is provided as a terminal to which an external power supply (not illustrated) is connected. The glass terminal 48 is electrically connected to the electric motor 30 through a power line 47.

The rotation shaft 21 includes a main shaft portion 21*a*, an eccentric shaft portion 21*b*, and a sub-shaft portion 21*c*. The main shaft portion 21*a*, the eccentric shaft portion 21*b*, and the sub-shaft portion 21*c* are arranged in this order from the upper side its axial direction. The axial direction corresponds to the longitudinal direction of each of the hermetically sealed container 10 and the rotation shaft 21. The electric motor 30 is fixed to the main shaft portion 21*a* by shrink fit or press fit. A cylindrical rolling piston 22 is slidably fitted to the eccentric shaft portion 21*b*.

As illustrated in FIGS. 1 and 2, the compression mechanism 20 includes the rolling piston 22, a cylinder 23, an upper bearing 24, a lower bearing 25, and a vane 26. In the cylinder 23, a cylindrical space is provided such that both ends thereof in the axial direction are opened, that is, a cylinder chamber 23*a* is provided. The cylinder chamber 23*a* houses the eccentric shaft portion 21*b* of the rotation shaft 21, the rolling piston 22, and the vane 26. The eccentric shaft portion 21*b* performs eccentric motion in the cylinder chamber 23*a*. The rolling piston 22 is fitted to the eccentric shaft portion 21*b*. The vane 26 partitions a space defined by an inner circumference of the cylinder 23 and an outer circumference of the rolling piston 22.

In the cylinder 23, a vane groove 23*c* is formed such that one of ends thereof is opened in the cylinder chamber 23*a* and the other is an end at which a back pressure chamber 23*b* is provided. In the vane groove 23*c*, the vane 26 is accommodated. The vane 26 moves back and forth in the radial direction in the vane groove 23*c*. The vane 26 is set in the vane groove 23*c*. In this state, the vane 26 is shaped in the form of a substantially cuboid having a length that is smaller than the length of the cylinder chamber 23*a* in the radial direction and that in the axial direction. In the back pressure chamber 23*b* of the vane groove 23*c*, a vane spring (not illustrated) is provided. In normal cases, high-pressure refrigerant gas in the hermetically sealed container 10 flows into the back pressure chamber 23*b*, and a differential pressure between the pressure of refrigerant gas in the back pressure chamber 23*b* and the pressure of refrigerant gas in the cylinder chamber 23*a* produces a force to move the vane 26 in the radial direction toward the center of the cylinder chamber 23*a*. The vane 26 is moved in the radial direction toward the center of the cylinder chamber 23*a* by the force produced due to the differential pressure between the back pressure chamber 23*b* and the cylinder chamber 23*a* and by a pressing force of the vane spring in the radial direction. The force to move the vane 26 in the radial direction brings one end of the vane 26, that is, an end portion of the vane 26 that adjoins the cylinder chamber 23*a*, into contact with the outer circumference of the rolling piston 22. As a result, the space defined by the inner circumference of the cylinder 23 and the outer circumference of the rolling piston 22 can be partitioned into sub-spaces. Even when the pressure of refrigerant gas in the hermetically sealed container 10, that is, a differential pressure between the pressure of the refrigerant gas in the back pressure chamber 23*b* and the pressure the refrigerant gas in the cylinder chamber 23*a*, is not sufficient to press the vane 26 against the outer circumference of the rolling piston 22, it is still possible to press one end of the vane 26 against the outer circumference of the rolling piston 22 by using the force of the vane spring. Thus, one end of the vane 26 can necessarily be brought into contact with the outer circumference of the rolling piston 22.

As illustrated in FIG. 1, the upper bearing 24 is fitted to the main shaft portion 21*a* of the rotation shaft 21 to rotatably support the main shaft portion 21*a*, and close one opening portion of the cylinder chamber 23*a* in the axial direction. Similarly, the lower bearing 25 is fitted to the sub-shaft portion 21*c* of the rotation shaft 21 to rotatably support the sub-shaft portion 21*c*, and close the other opening portion of the cylinder chamber 23*a* in the axial direction. The upper bearing 24 has a substantially inverted T-shape as viewed side-on. The lower bearing 25 has a substantially T-shape as viewed side-on. The cylinder 23 is provided with a suction port (not illustrated) through which the refrigerant gas is sucked into the cylinder chamber 23*a* from the outside of the hermetically sealed container 10. The upper bearing 24 is provided with a discharge port (not illustrated) through which the compressed refrigerant gas is discharged to the outside of the cylinder chamber 23*a*.

At the discharge port of the upper bearing 24, a discharge valve (not illustrated) is provided. The discharge valve controls the timing of discharging high-temperature and high-pressure refrigerant gas from the cylinder 23 through the discharge port. To be more specific, the discharge valve is kept closed until the pressure of refrigerant gas that is compressed in the cylinder chamber 23*a* of the cylinder 23 reaches a predetermined pressure. When the pressure of the refrigerant gas reaches the predetermined pressure or higher, the discharge valve is opened to allow the high-temperature and high-pressure refrigerant gas to be discharged to the outside of the cylinder chamber 23*a*.

In the cylinder chamber 23*a*, suction, compression, and discharge are repeated. Thus, the refrigerant gas is intermittently discharged from the discharge port, thus causing noise such as pulsation noise. In order to reduce this noise, a discharge muffler 27 is provided on an outer side of the upper bearing 24, that is, on a side of the upper bearing 24 that faces the electric motor 30, such that the discharge muffler 27 covers the upper bearing 24. The discharge muffler 27 has a discharge hole (not illustrated) through which a space defined by the discharge muffler 27 and the upper bearing 24 communicates with the interior of the hermetically sealed container 10. Refrigerant gas to be discharged from the cylinder 23 through the discharge port is once discharged to the space defined by the discharge muffler 27 and the upper bearing 24, and is then discharged from the discharge hole into the hermetically sealed container 10.

Beside the hermetically sealed container 10, a suction muffler 101 is provided to prevent liquid refrigerant from being directly sucked into the cylinder chamber 23*a* of the cylinder 23. In general, the hermetically sealed compressor 100 is supplied with a mixture of low-pressure refrigerant gas and liquid refrigerant from a refrigerant circuit to which the hermetically sealed compressor 100 is connected. When the liquid refrigerant flows into the cylinder 23 and is compressed in the compression mechanism 20, this causes occurrence of a failure in the compression mechanism 20. Therefore, in the suction muffler 101, the refrigerant gas is separated from the liquid refrigerant, and only this refrigerant gas is sent to the cylinder chamber 23*a*. The suction muffler 101 is connected to the suction port of the cylinder 23 by a suction connection pipe 101*a*. Low-pressure refrigerant gas that is sent from the suction muffler 101 is sucked into the cylinder chamber 23*a* through the suction connection pipe 101*a*.

The compression mechanism 20 is configured as described above, and the eccentric shaft portion 21*b* of the rotation shaft 21 is rotated in the cylinder chamber 23*a* of the cylinder 23 by the rotational motion of the rotation shaft 21. An operating chamber is defined by the inner circumference of the cylinder 23, the outer circumference of the rolling piston 22 fitted to the eccentric shaft portion 21*b*, and the vane 26. The volume of the operating chamber increases or decreases as the rotation shaft 21 rotates. First, the operating chamber communicates with the suction port, and low-pressure refrigerant gas is then sucked into this operating chamber. Next, the communication between the operating chamber and the suction port is blocked, and as the volume of the operating chamber decreases, refrigerant gas in the operating chamber is compressed. Finally, the operating chamber communicates with the discharge port, and after the pressure of the refrigerant gas in the operating chamber reaches a predetermined pressure, the discharge valve provided at the discharge port is opened, and the refrigerant gas compressed to be in a high-pressure and high-temperature state is discharged to the outside of the operating chamber, that is, the outside of the cylinder chamber 23*a*. The high-pressure high-temperature refrigerant gas discharged from the cylinder chamber 23*a* through the discharge muffler 27 to the interior of the hermetically sealed container 10 passes through the electric motor 30, then flows up in the hermetically sealed container 10, and is discharged to the outside of the hermetically sealed container 10 from a discharge pipe 102 provided on the upper portion of the hermetically sealed container 10. The refrigeration circuit in which the refrigerant flows is provided outside the hermetically sealed container 10. The discharged refrigerant circulates in the refrigeration circuit and flows back to the suction muffler 101.

Figure 3:
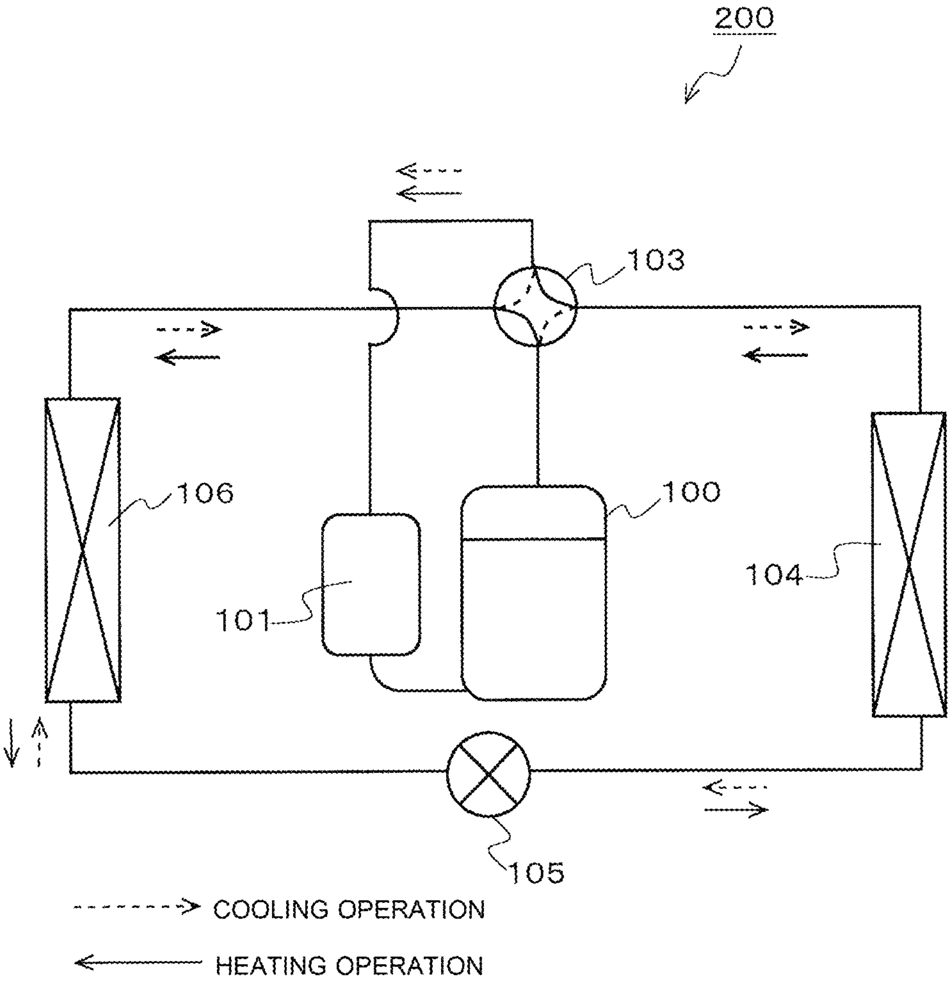
FIG. 3 is a schematic configuration diagram of a refrigeration cycle apparatus, such as an air-conditioning apparatus, to which the hermetically sealed compressor according to Embodiment 1 is connected.

FIG. 3 is a schematic configuration diagram of a refrigeration cycle apparatus 200, such as an air-conditioning apparatus, to which the hermetically sealed compressor 100 is connected. As illustrated in FIG. 3, the refrigeration cycle apparatus 200 includes the hermetically sealed compressor 100, the suction muffler 101 connected to the suction side of the hermetically sealed compressor 100, a four-way switching valve 103 connected to the discharge side of the hermetically sealed compressor 100 to switch the flow direction of refrigerant that flows from the hermetically sealed compressor 100, an outdoor-side heat exchanger 104, a pressure reducing device 105 such as an electric expansion valve, and an indoor-side heat exchanger 106. These components are sequentially connected by pipes, whereby the refrigeration circuit is formed. It should be noted that in general, in an air-conditioning apparatus, the indoor-side heat exchanger 106 is provided in an indoor apparatus, while the hermetically sealed compressor 100, the suction muffler 101, the four-way switching valve 103, the outdoor-side heat exchanger 104, and the pressure reducing device 105 are provided in an outdoor apparatus.

In heating operation of the refrigeration cycle apparatus 200, the four-way switching valve 103 is connected to the indoor-side heat exchanger 106 as indicated by solid lines in FIG. 3. High-temperature and high-pressure refrigerant obtained through compression by the hermetically sealed compressor 100 flows to the indoor-side heat exchanger 106, and condenses and liquefies to change into liquid refrigerant. Thereafter, this liquid refrigerant is reduced in pressure by the pressure reducing device 105 to change into low-temperature and low-pressure two-phase refrigerant. Thereafter, the low-temperature and low-pressure two-phase refrigerant flows to the outdoor-side heat exchanger 104, and evaporates and gasifies to change into gas refrigerant. The gas refrigerant passes through the four-way switching valve 103 and the suction muffler 101 and flows back to the hermetically sealed compressor 100. That is, the refrigerant circulates in such a manner as indicated by solid arrows in FIG. 3. Because of this circulation of the refrigerant, the outdoor-side heat exchanger 104 that serves as an evaporator causes heat exchange to be performed between the refrigerant and outside air, and the refrigerant sent to the outdoor-side heat exchanger 104 receives heat from the outside air. The refrigerant that has received heat is sent to the indoor-side heat exchanger 106 that serves as a condenser, and exchanges heat with indoor air to heat the indoor air.

In cooling operation of the refrigeration cycle apparatus 200, the four-way switching valve 103 is connected to the outdoor-side heat exchanger 104 as indicated by dotted lines in FIG. 3. High-temperature and high-pressure refrigerant obtained through compression by the hermetically sealed compressor 100 flows to the outdoor-side heat exchanger 104 and condenses and liquefy to change into liquid refrigerant. Thereafter, this liquid refrigerant is reduced in pressure by the pressure reducing device 105 to change into low-temperature and low-pressure two-phase refrigerant. Thereafter, the low-temperature and low-pressure two-phase refrigerant flows to the indoor-side heat exchanger 106 and evaporates and gasifies to change into gas refrigerant. The gas refrigerant passes through the four-way switching valve 103 and the suction muffler 101 and flows back to the hermetically sealed compressor 100.

To be more specific, when the operation is changed from the heating operation to the cooling operation, the indoor-side heat exchanger 106 operating as a condenser changes to operate an evaporator, and the outdoor-side heat exchanger 104 operating as an evaporator changes to operate as a condenser. As a result, the refrigerant circulates in such a manner as indicated by dashed arrows in FIG. 3. Because of this circulation of the refrigerant, at the indoor-side heat exchanger 106 operating as an evaporator, the refrigerant exchanges heat with indoor air, and receives heat from the indoor air, thereby cooling the indoor air. The refrigerant that has received heat is sent to the outdoor-side heat exchanger 104 serving as a condenser, and exchanges heat with outside air and transfer heat to the outside air.

In this case, R407C refrigerant, R410A refrigerant, R32 refrigerant, or another kind of refrigerant is used as refrigerant that flows in the refrigeration circuit.

Figure 4:
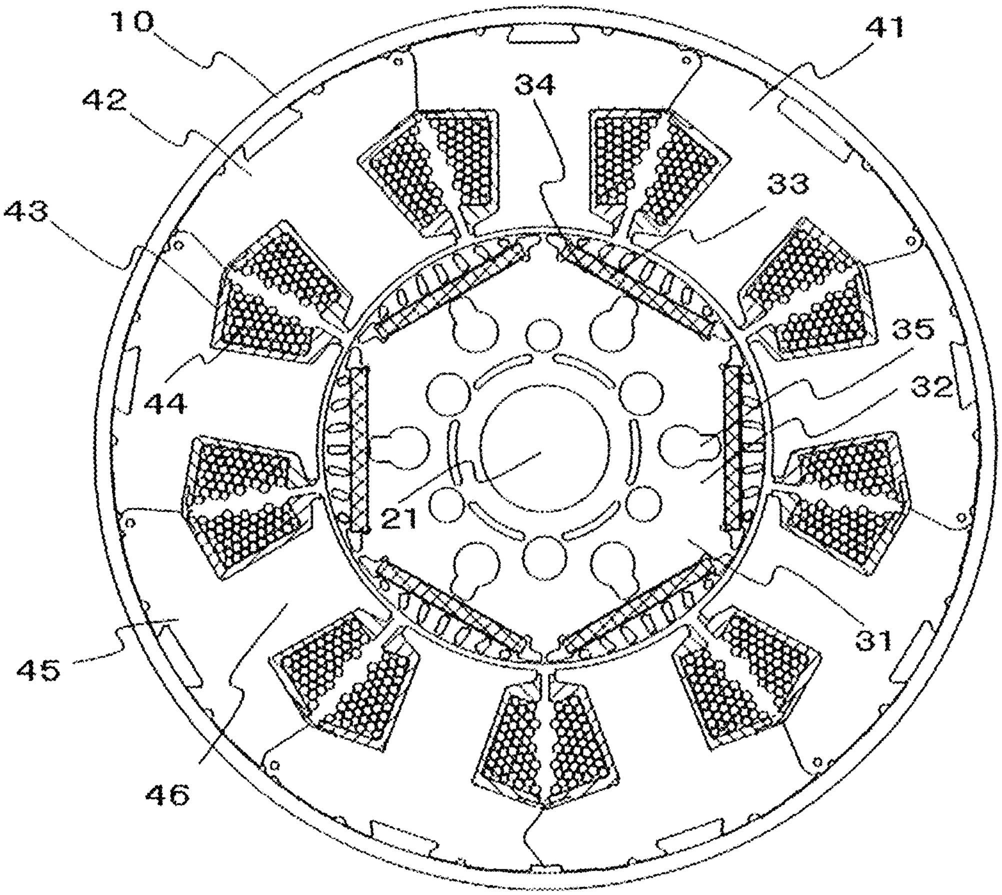
FIG. 4 is a cross-sectional view of the hermetically sealed compressor taken along the B-B' line in FIG. 1, as viewed from above.

FIG. 4 is a cross-sectional view of the hermetically sealed compressor 100 that is taken along line B-B' in FIG. 1, as viewed from above. Next, the electric motor 30 configured to transmit a rotational force to the compression mechanism 20 will be described. As illustrated in FIG. 4, the electric motor 30 includes a substantially cylindrical stator 41 having a substantially cylindrical shape and fixed to the inner circumference of the hermetically sealed container 10, and a substantially columnar rotor 31 having a substantially columnar shape and located inward of the stator 41.

The rotor 31 includes a rotor iron core 32 that is formed such that core sheets stamped out from a thin electromagnetic steel sheet are stacked together. As the rotor 31, a rotor using permanent magnets like a blushless DC motor or a rotor using secondary winding like an induction motor is used. For example, in the case where the electric motor 30 is such a blushless DC motor as illustrated in FIG. 4, magnet insertion holes 33 are provided in the axial direction of the rotor iron core 32, and in the magnet insertion holes 33, permanent magnets 34 such as ferrite magnets or rare-earth magnets are inserted. The permanent magnets 34 form magnetic poles on the rotor 31. Magnetic fluxes generated by the magnetic poles on the rotor 31 and magnetic fluxes generated by windings 44 on the stator 41 effect rotation of the rotor 31. The winding 44 will be described later. In the case where the electric motor 30 is an induction motor (not illustrated), secondary windings are provided on the rotor iron core 32, instead of the permanent magnets. The windings 44 on the stator 41 induce the magnetic fluxes to the secondary windings on the rotor 31 to generate a rotational force that causes the rotor 31 to rotate.

At the center of the rotor iron core 32, a shaft hole (not illustrated) is provided through which the rotation shaft 21 extends. The main shaft portion 21*a* of the rotation shaft 21 is fastened to the rotor iron core 32 by, for example, shrink fit. Thus, the rotational motion of the rotor 31 is transmitted to the rotation shaft 21. Around the shaft hole, air holes 35 are provided. High-pressure and high-temperature refrigerant obtained through compression by the compression mechanism 20 located below the electric motor 30 passes through the air holes 35. It should be noted that the refrigerant compressed by the compression mechanism 20 also passes through an air space between the rotor 31 and the stator 41 and a gap between the windings 44, in addition to the air holes 35.

Figure 5:
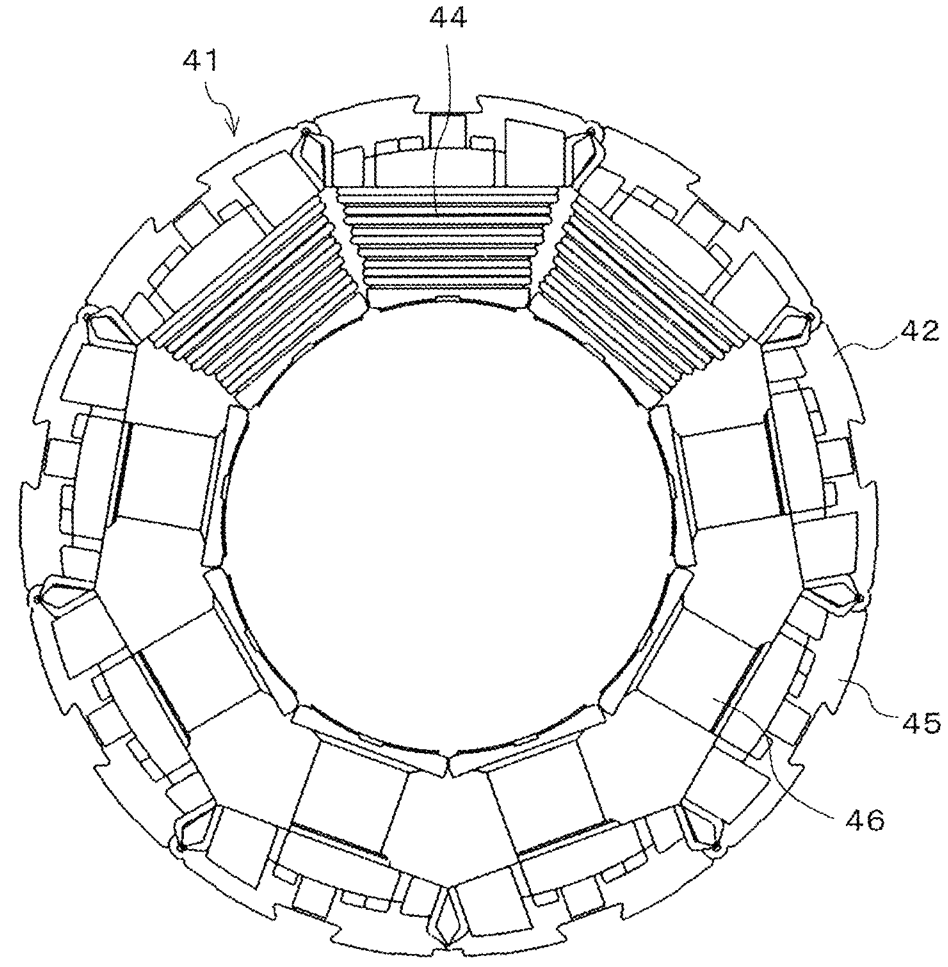
FIG. 5 is an annular plan view of a stator according to Embodiment 1.
Figure 6:
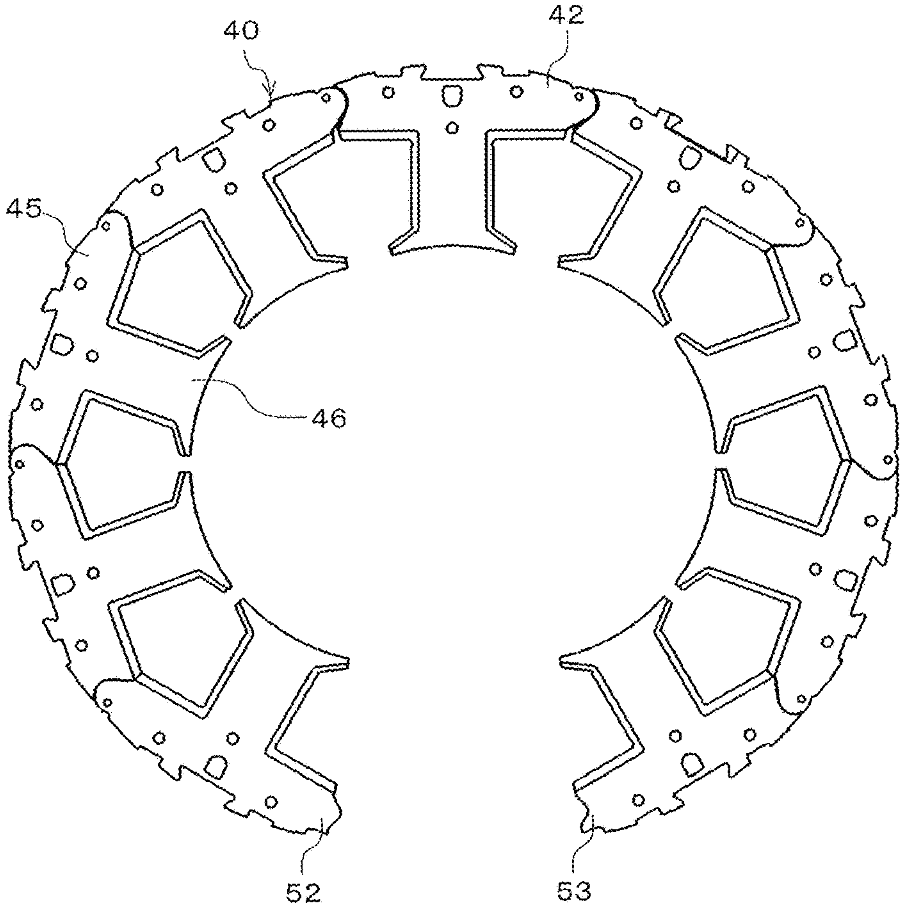
FIG. 6 is a plan view of stator iron cores of the stator according to Embodiment 1.
Figure 7:
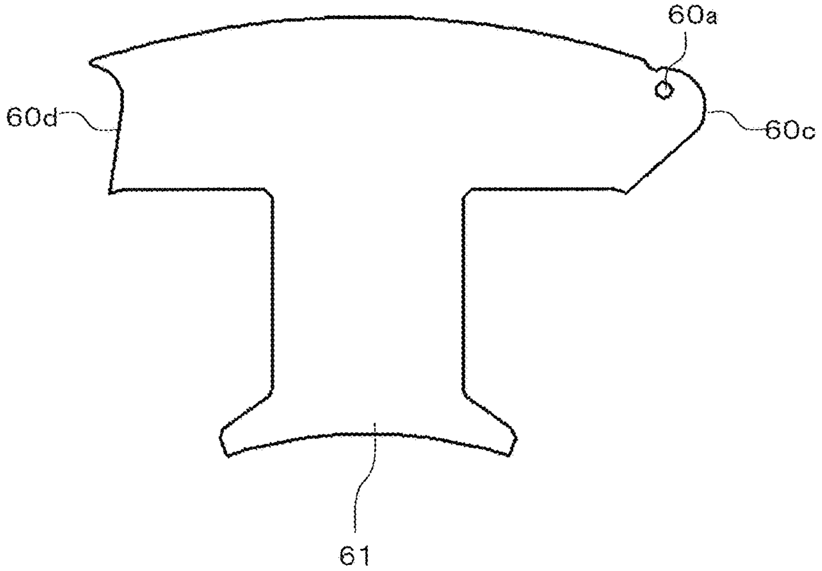
FIG. 7 is a plan view of a stator iron core piece (first core part) of the stator according to Embodiment 1.
Figure 8:
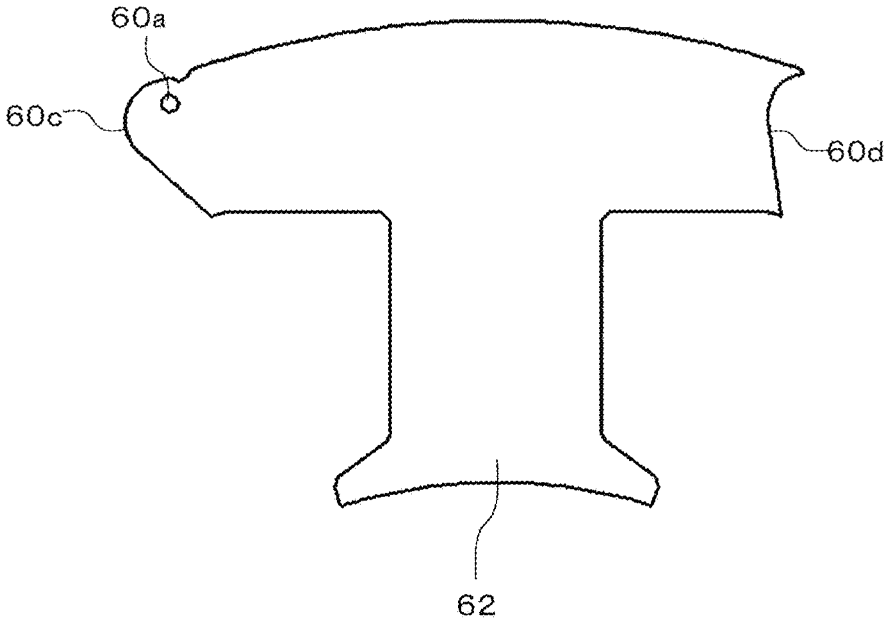
FIG. 8 is a plan view of a stator iron core piece (second core part) of the stator according to Embodiment 1.
Figure 9:
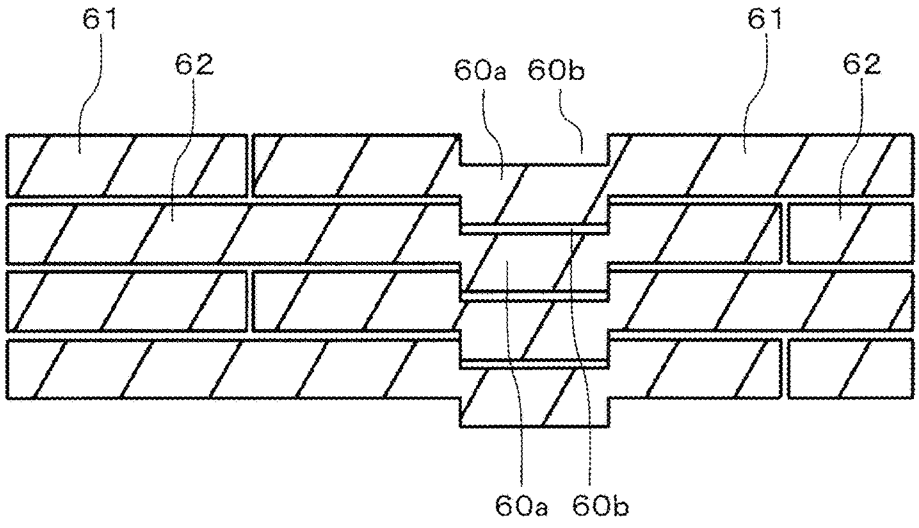
FIG. 9 is a sectional view of a laminated structure of the stator iron cores of the stator according to Embodiment 1.
Figure 10:
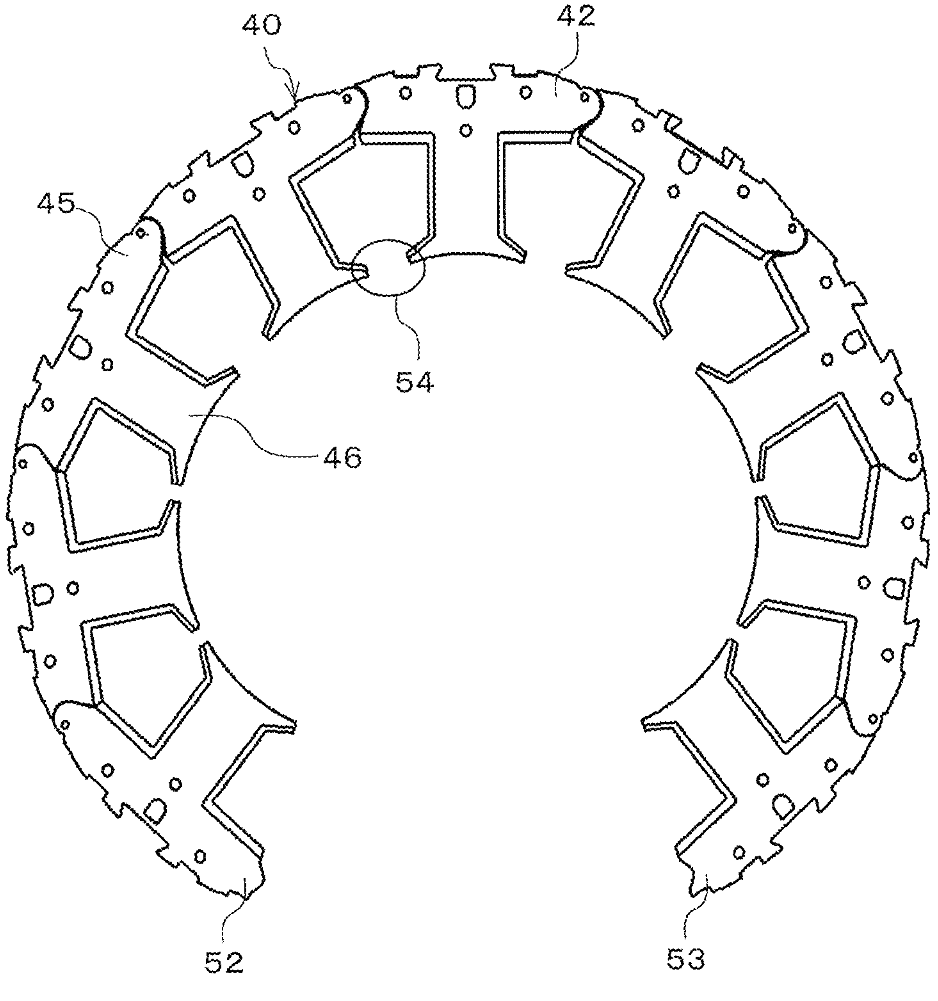
FIG. 10 is a plan view of C-shaped stator cores of the stator according to Embodiment 1.
Figure 11:
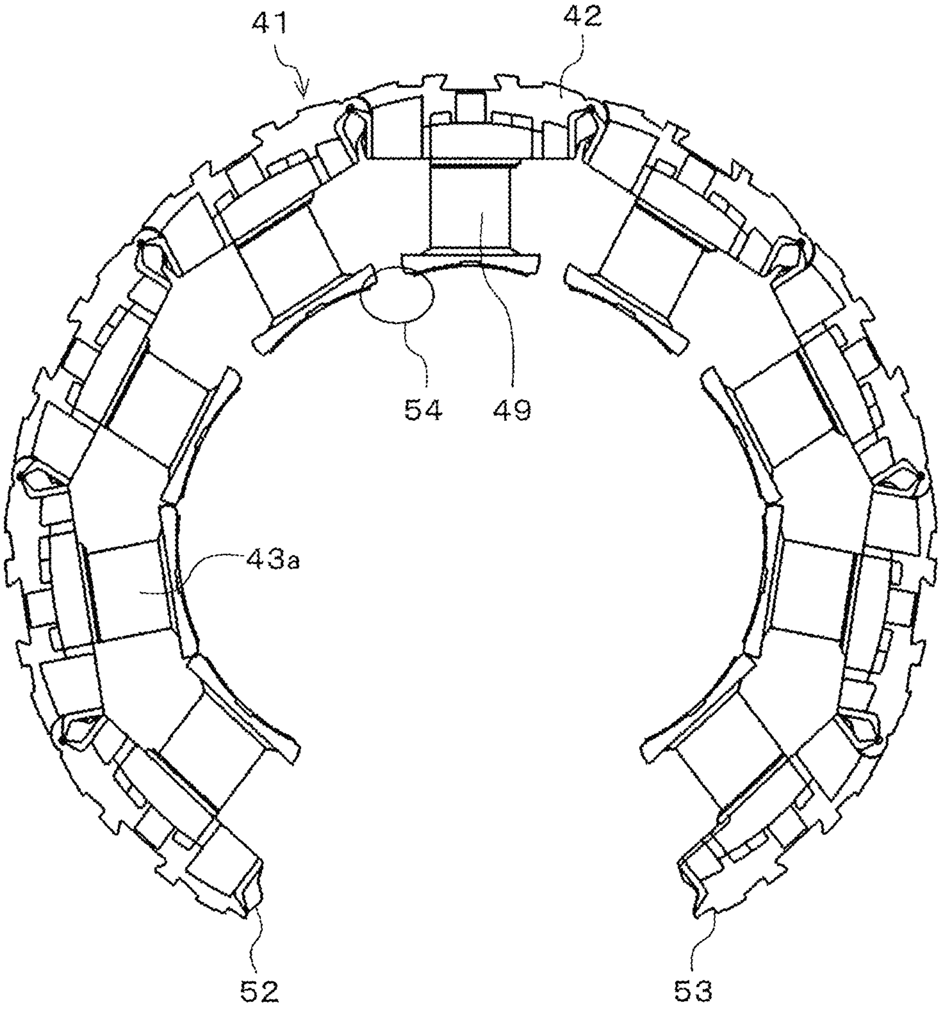
FIG. 11 is a plan view of the C-shaped stator according to Embodiment 1 before winding.
Figure 12:
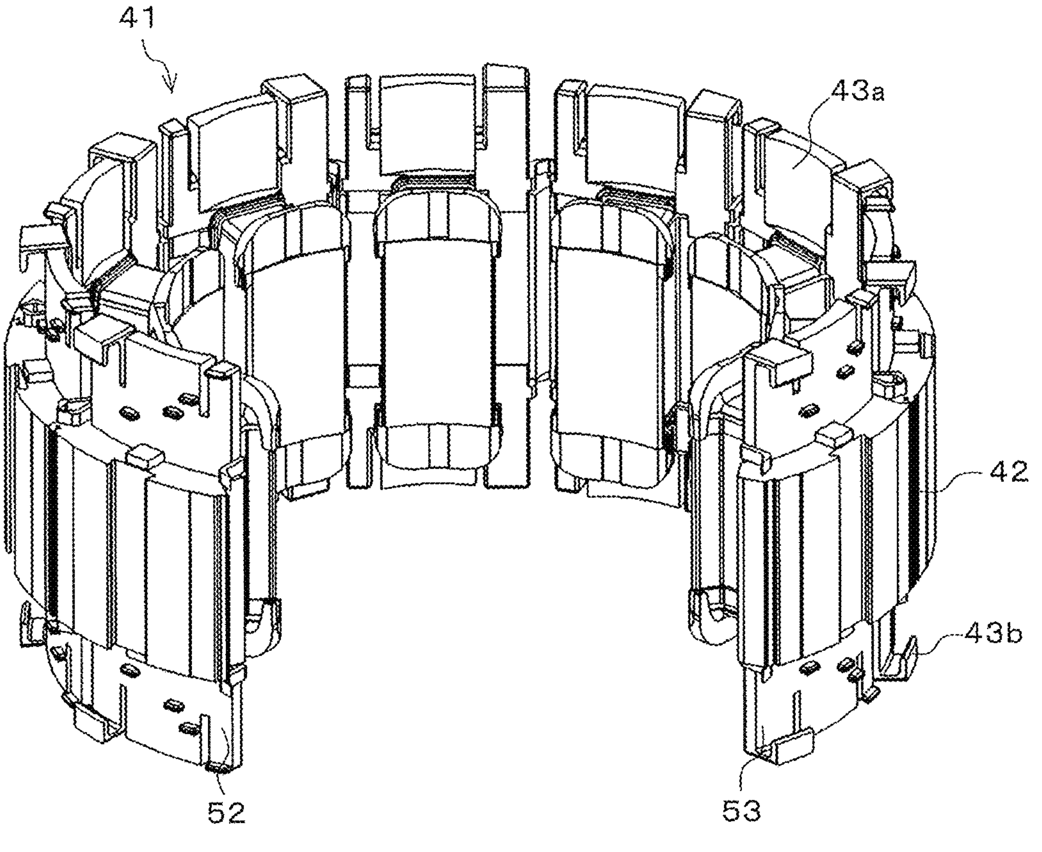
FIG. 12 is a perspective view of the C-shaped stator according to Embodiment 1 before winding.
Figure 13:
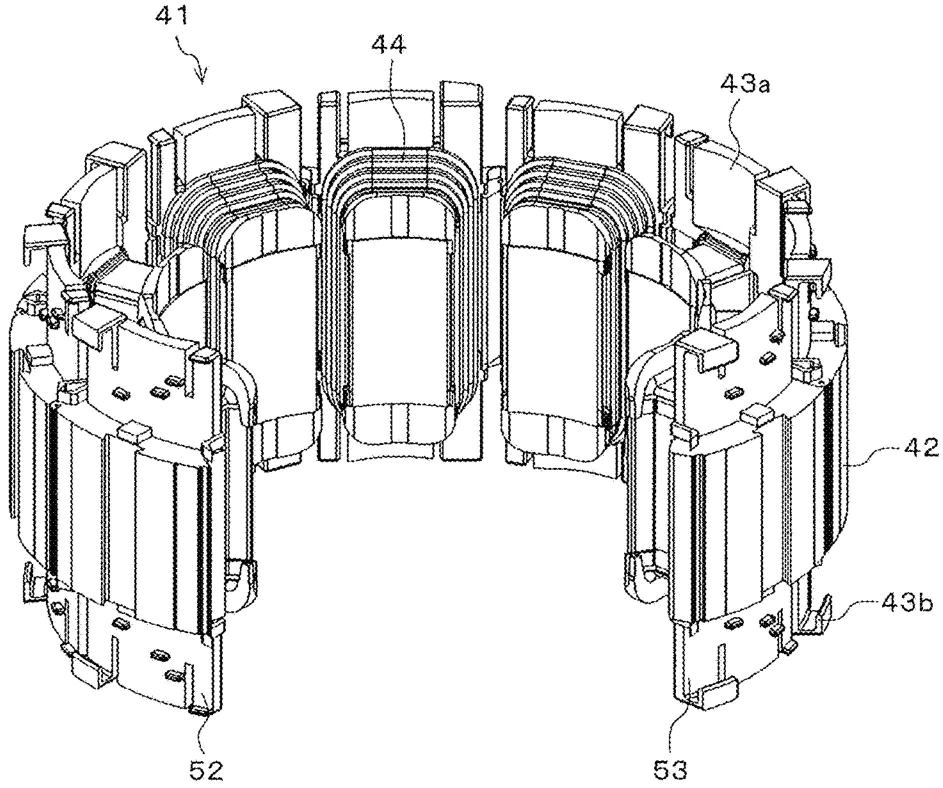
FIG. 13 is a perspective view of the C-shaped stator according to Embodiment 1 after winding.
Figure 14:
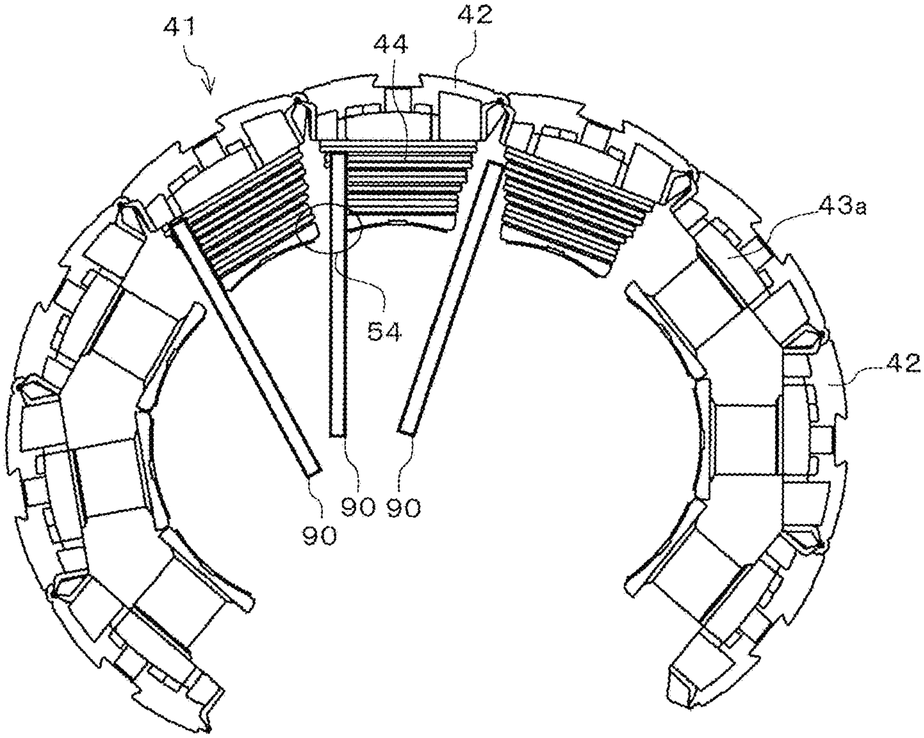
FIG. 14 is a plan view of the C-shaped stator according to Embodiment 1 after winding.
Figure 15:
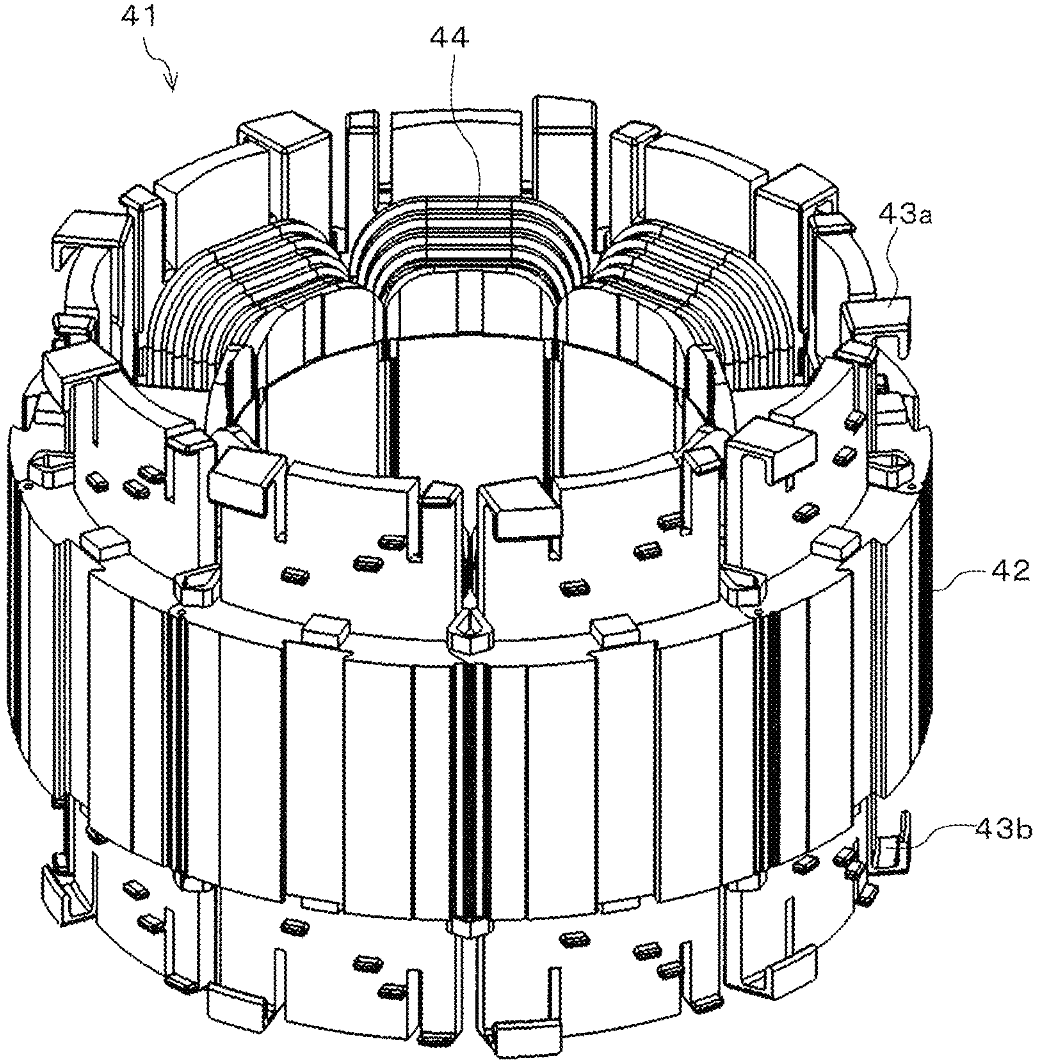
FIG. 15 is a perspective view of the stator formed annularly according to Embodiment 1 after winding.
Figure 16:
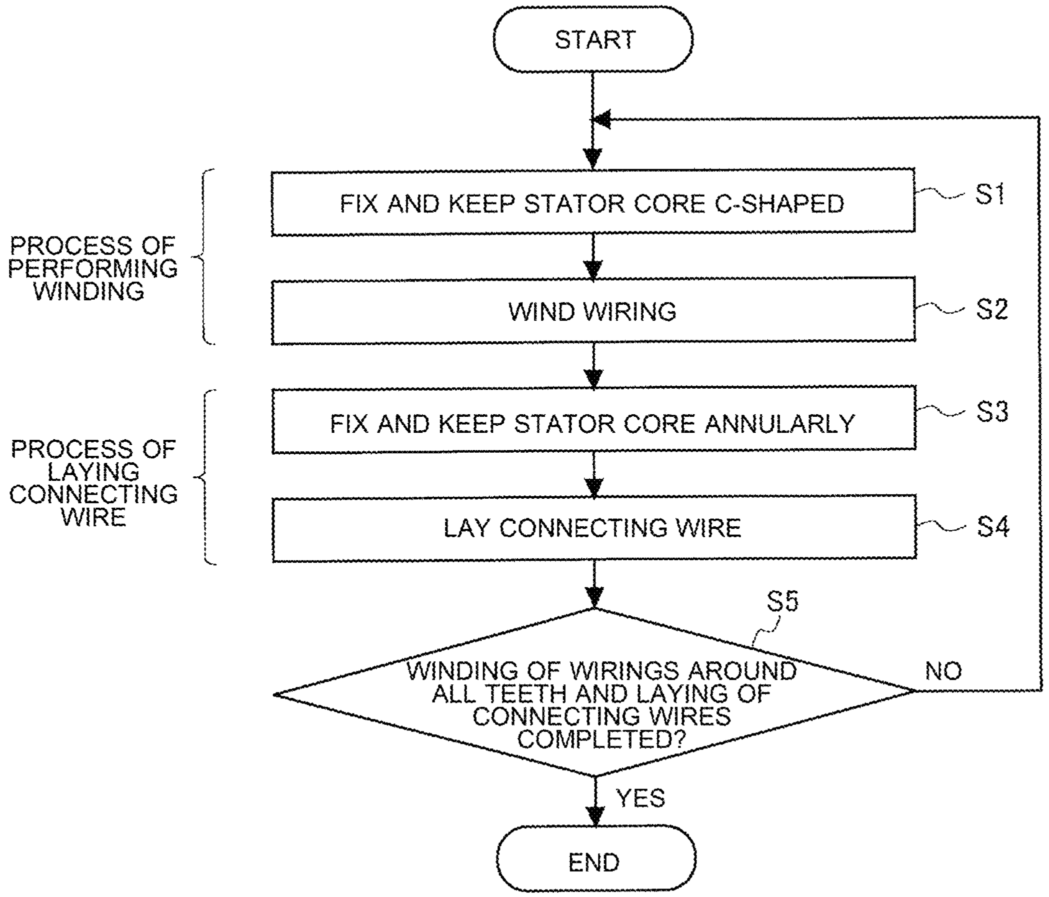
FIG. 16 is a flowchart illustrating a manufacturing method of the stator according to Embodiment 1.
Figure 17:
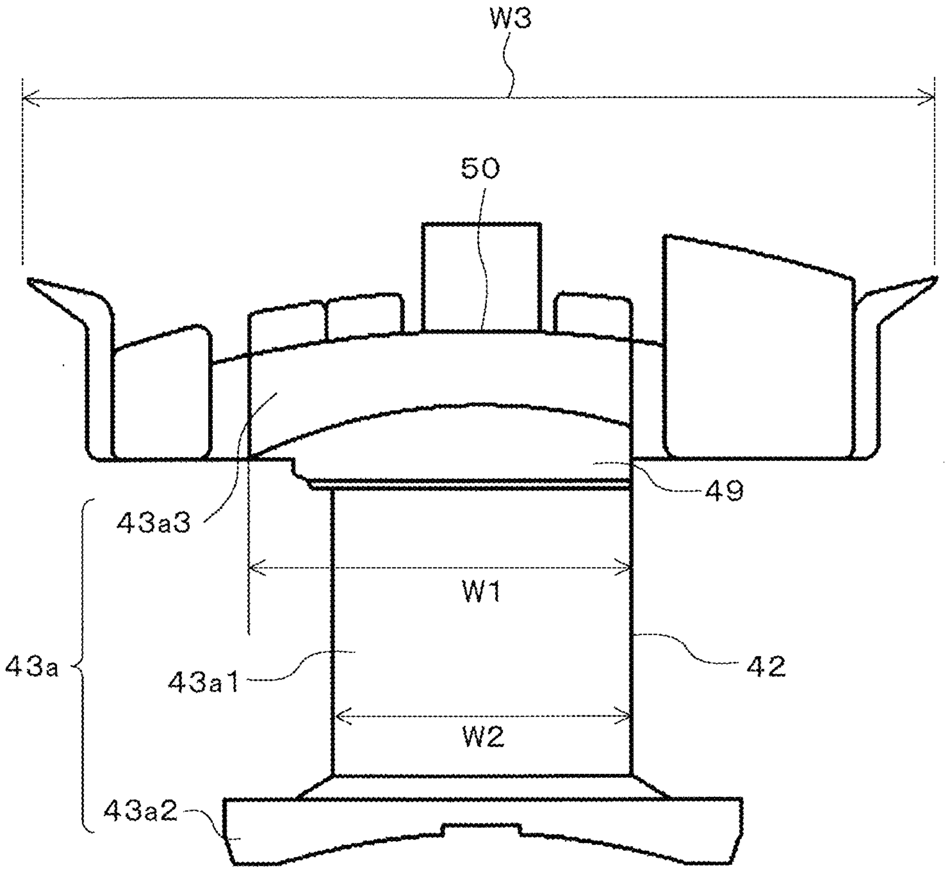
FIG. 17 is a plan view of insulators of the stator according to Embodiment 1.
Figure 18:
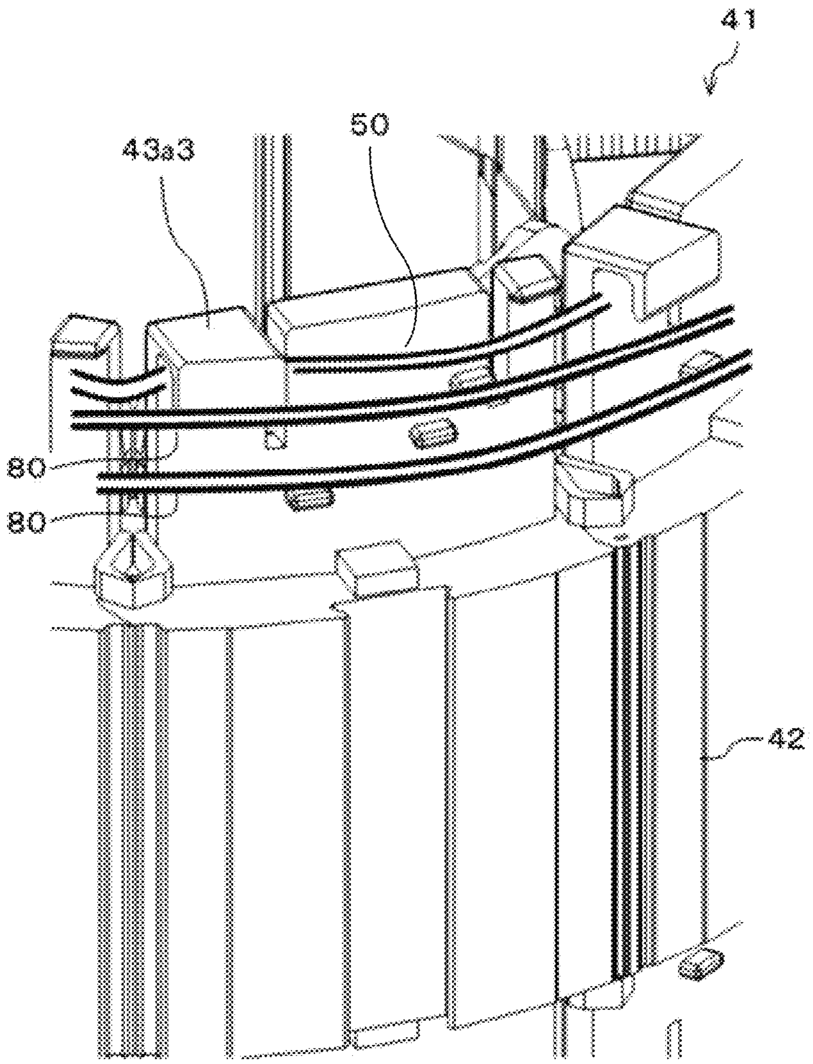
FIG. 18 is a perspective view illustrating a method of laying connecting wires of the stator according to Embodiment 1.
Figure 19:
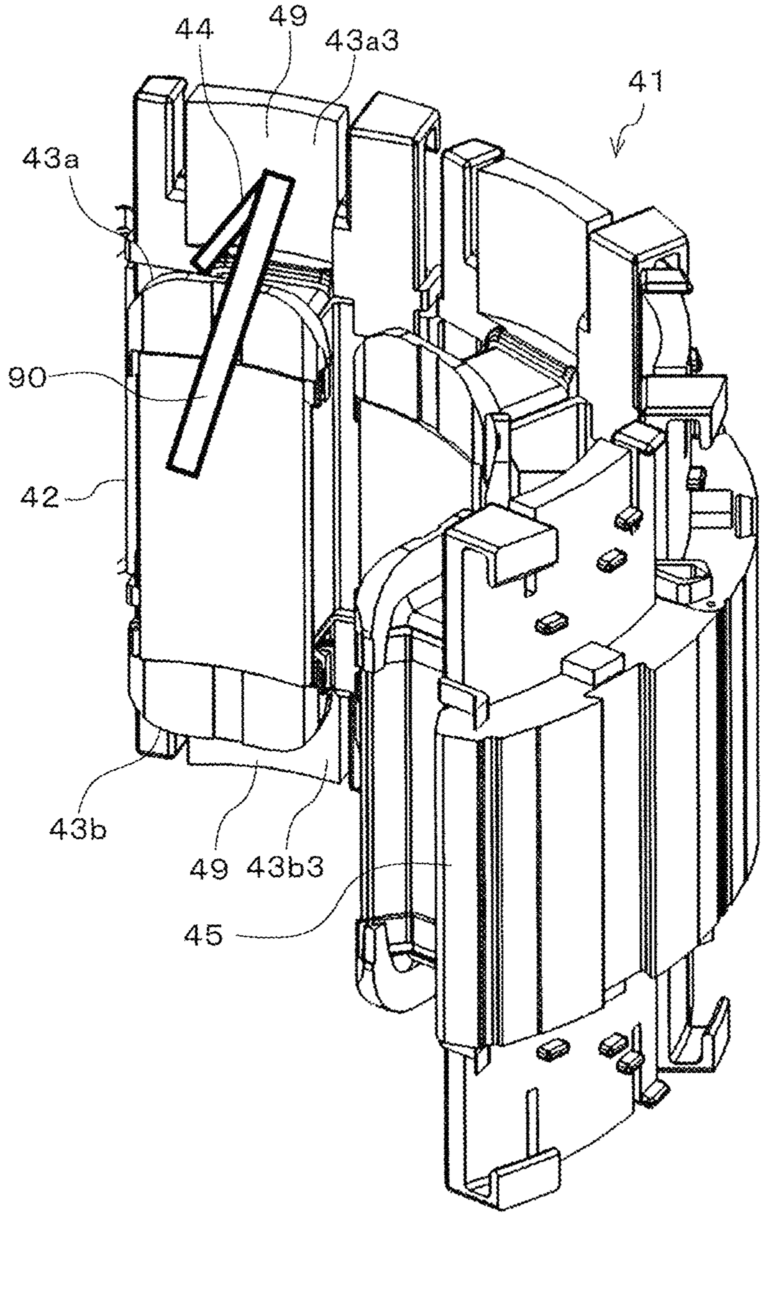
FIG. 19 is a perspective view illustrating a process of performing winding on the stator according to Embodiment 1.
Figure 20:
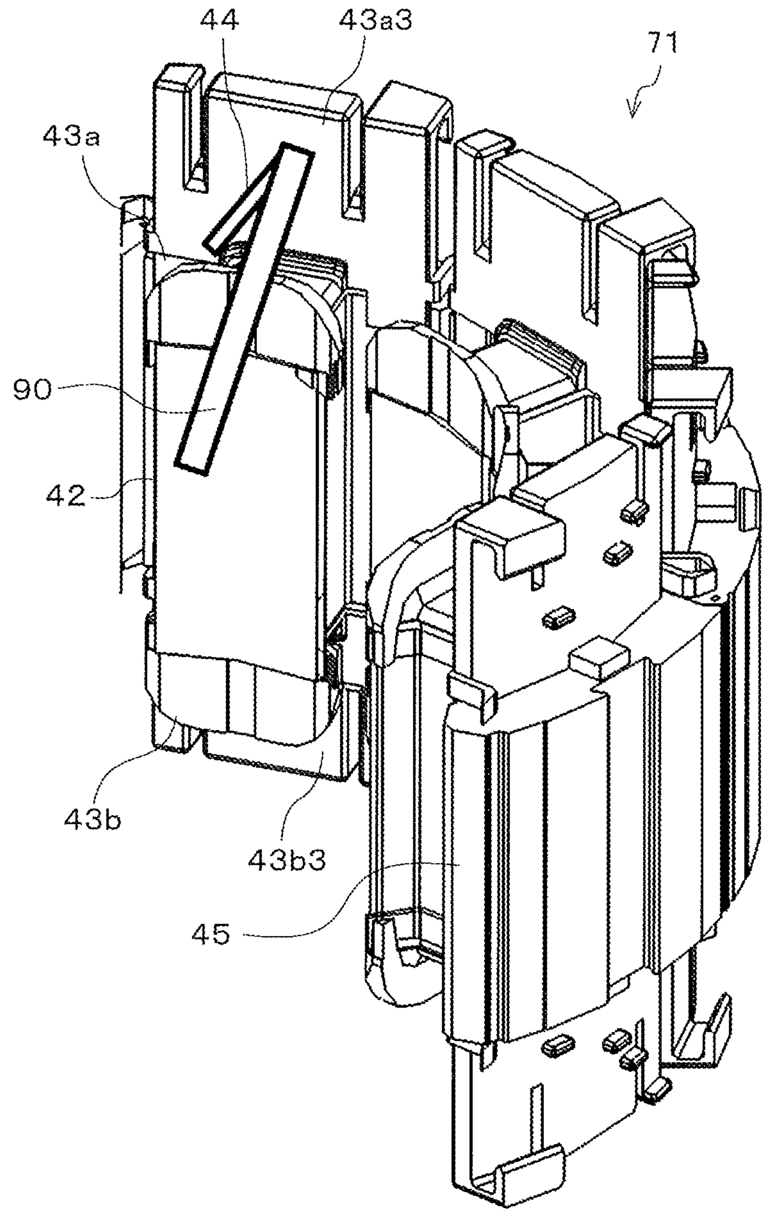
FIG. 20 is a schematic explanatory view illustrating a process of performing winding on a stator of a comparative example.
Figure 21:
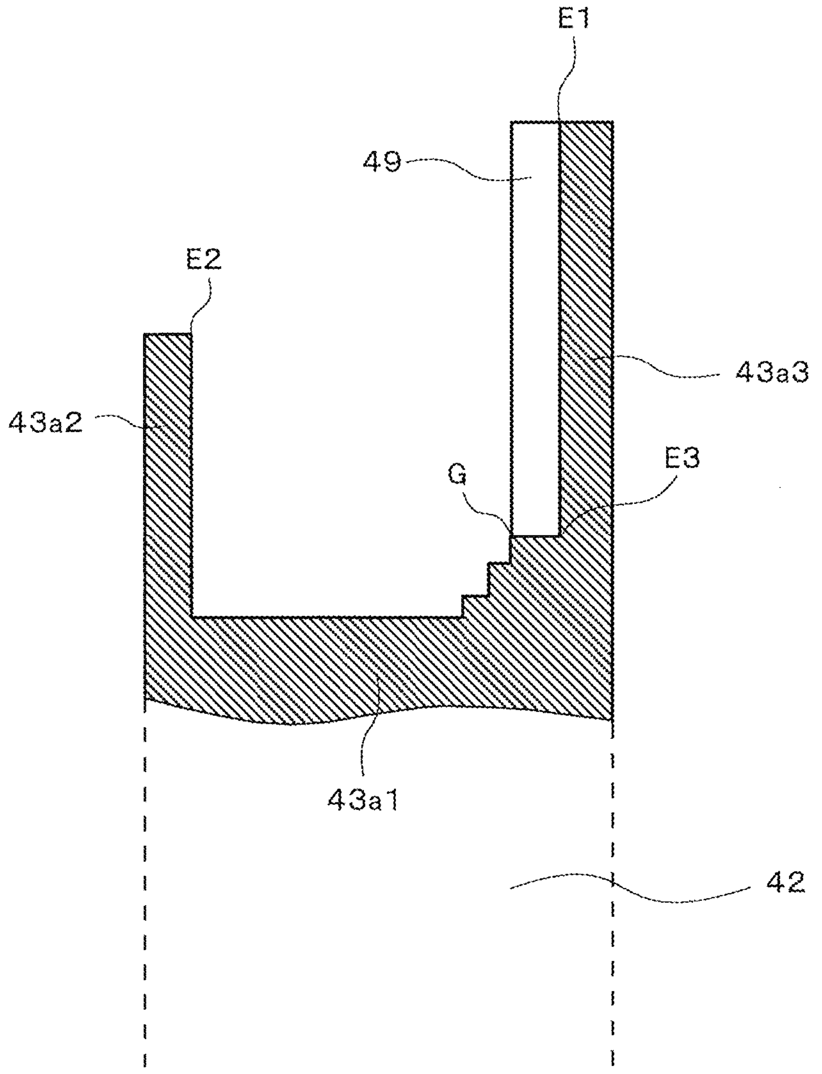
FIG. 21 is a sectional view of an insulator of the stator according to Embodiment 1.
Figure 22:
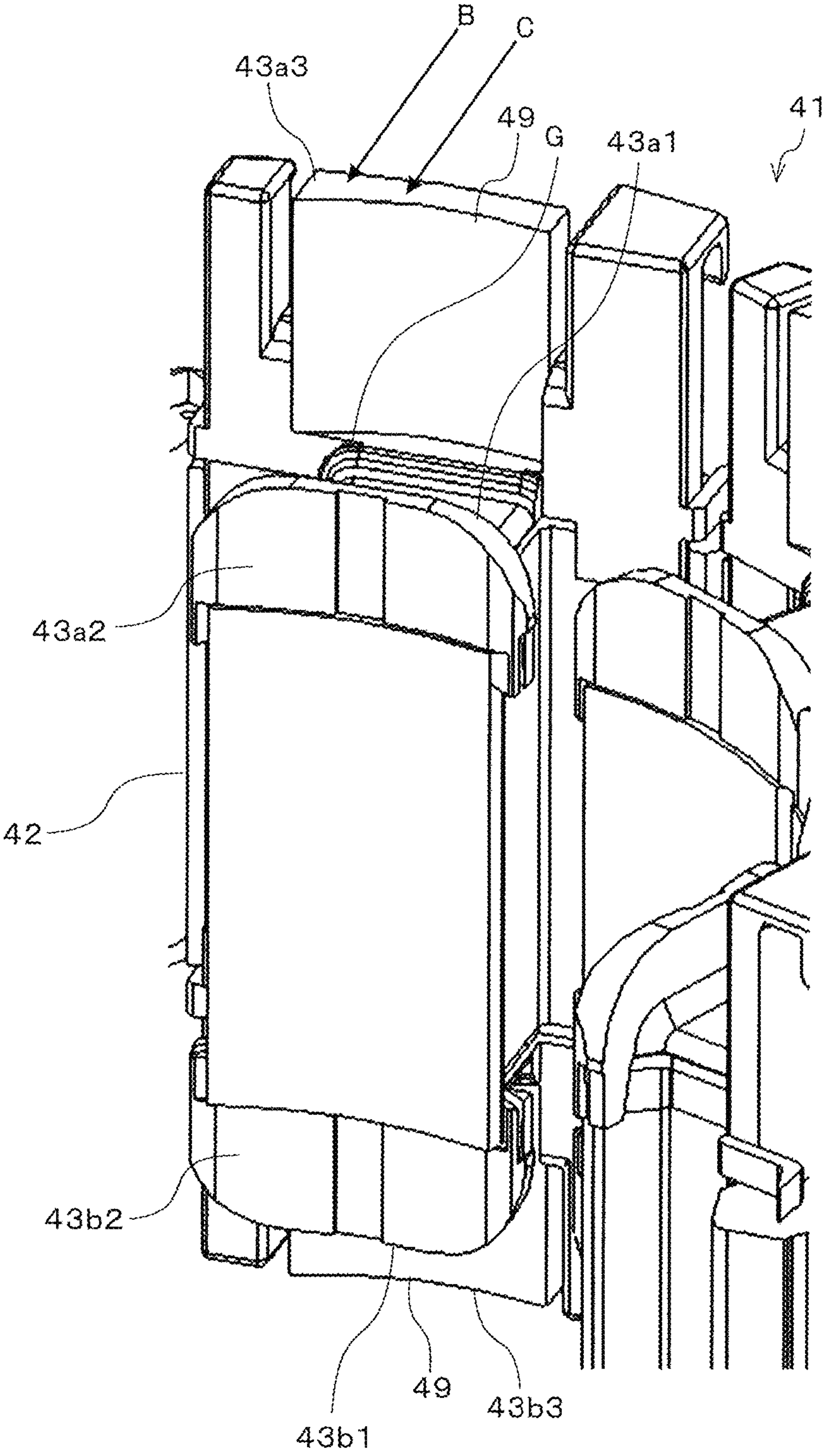
FIG. 22 is a partially-enlarged perspective view of the stator according to Embodiment 1.
Figure 23:
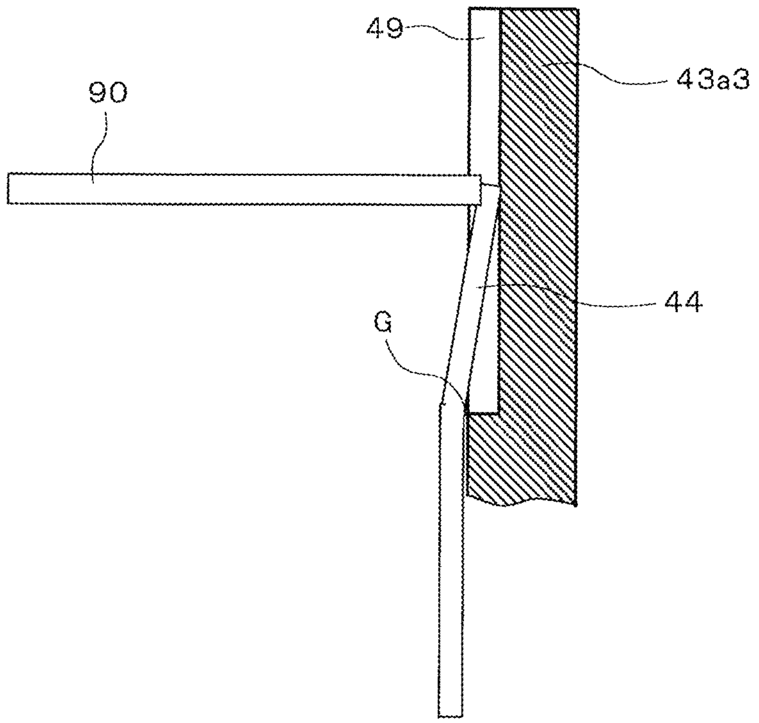
FIG. 23 is a sectional view of an upper portion of the stator that is taken along an up-down direction at a portion of the stator that is indicated by an arrow B in FIG. 22.
Figure 24:
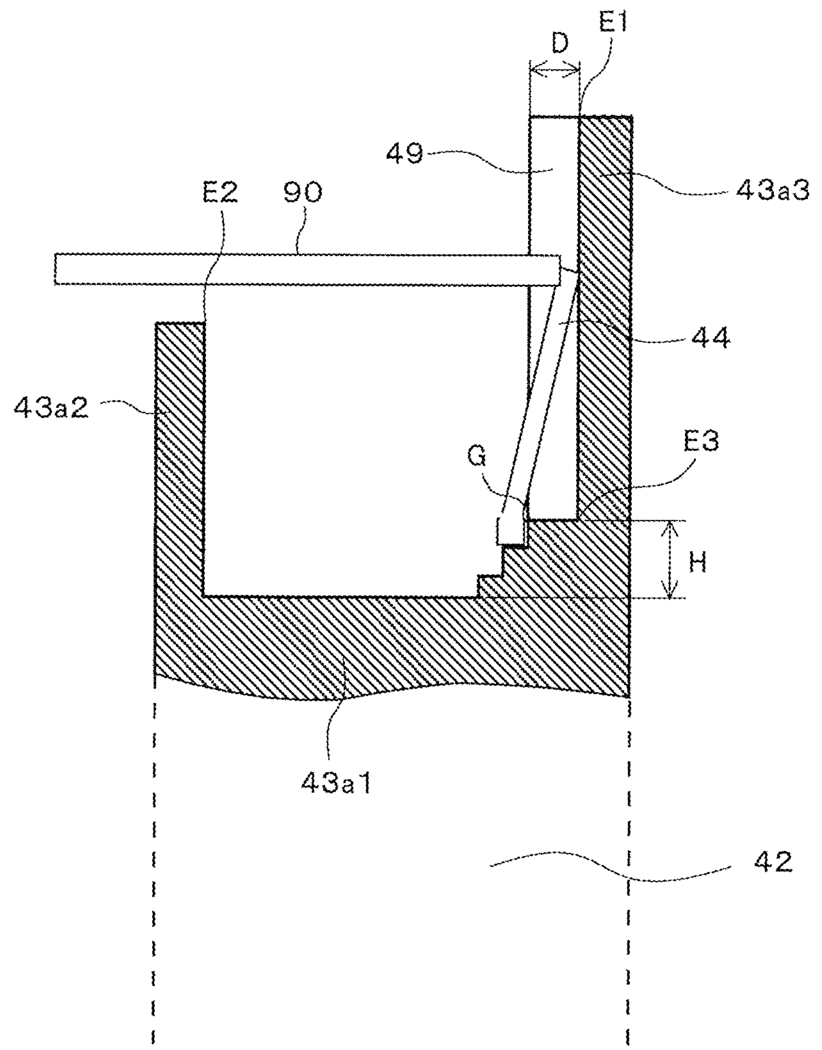
FIG. 24 is a sectional view of the upper portion of the stator that is taken along the up-down direction at a portion of the stator that is indicated by an arrow C in FIG. 22.
Figure 25:
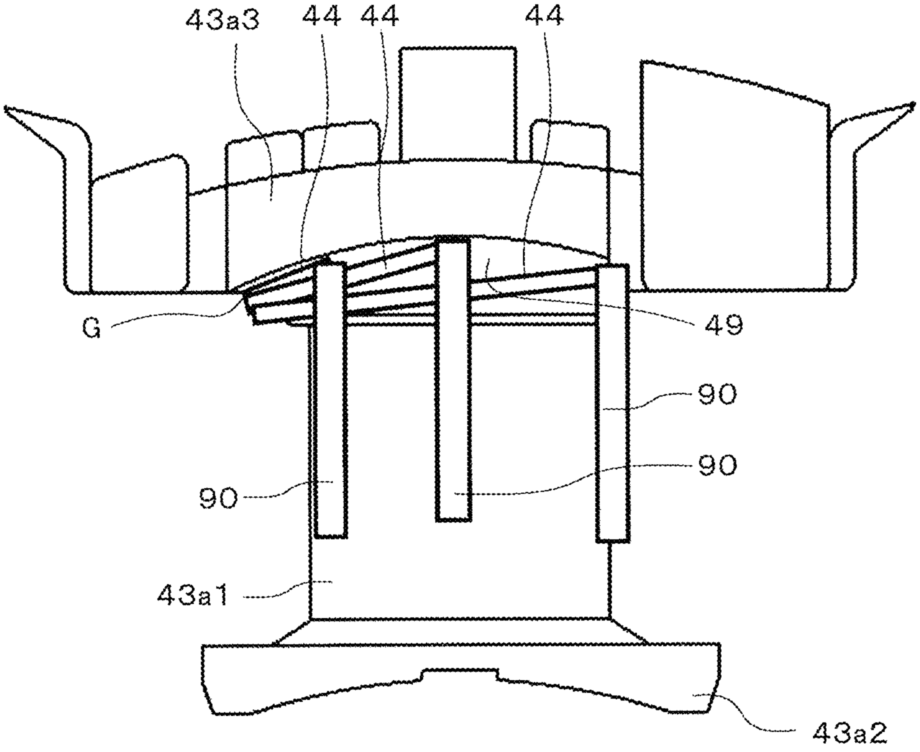
FIG. 25 is a plan view illustrating the process of performing winding at the stator according to Embodiment 1.
Figure 26:
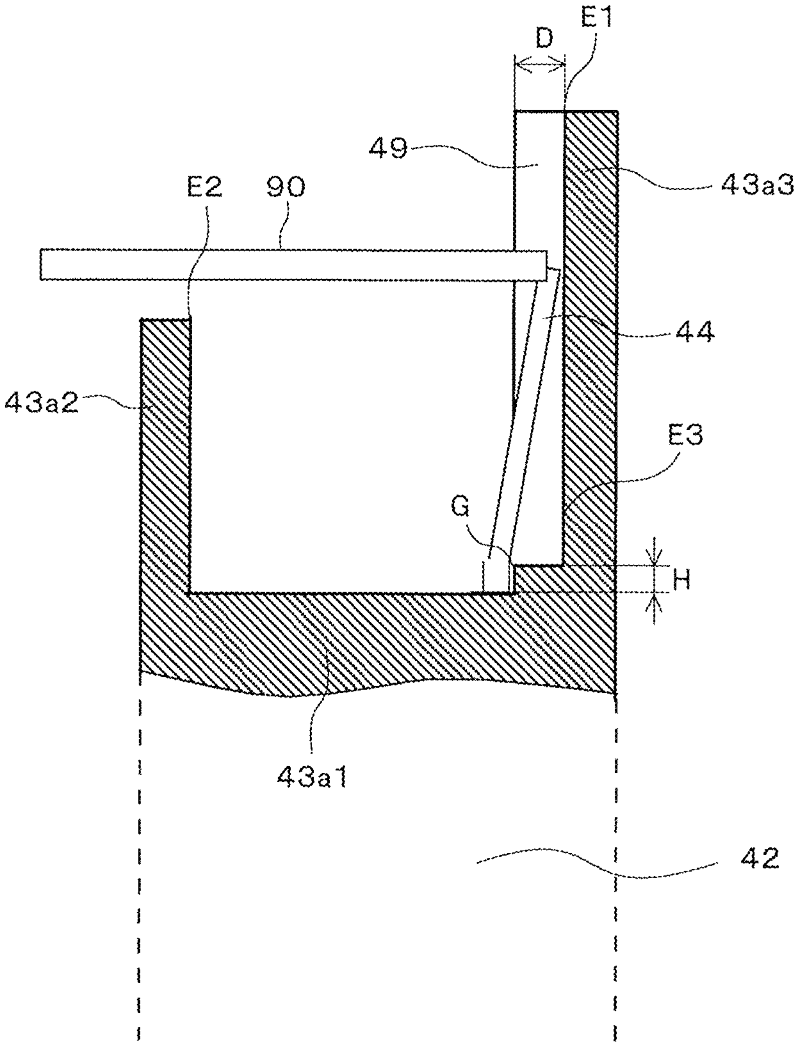
FIG. 26 is a sectional view of another configuration of insulators in the stator according to Embodiment 1.

FIG. 5 is an annular plan view of the stator 41 according to Embodiment 1. FIG. 6 is a plan view of a stator core 40 of the stator 41 according to Embodiment 1. FIG. 7 is a plan view of a stator iron core piece (first core part 61) of the stator 41 according to Embodiment 1. FIG. 8 is a plan view of a stator iron core piece (second core part 62) of the stator 41 according to Embodiment 1. FIG. 9 is a sectional view of a laminated structure of stator iron cores 42 of the stator 41 according to Embodiment 1. FIG. 10 is a plan view of C-shaped stator cores 40 of the stator 41 according to Embodiment 1. FIG. 11 is a plan view of the C-shaped stator cores 40 of the stator 41 according to Embodiment 1 before winding. FIG. 12 is a perspective view of the C-shaped stator 41 according to Embodiment 1 before winding. FIG. 13 is a perspective view of the C-shaped stator 41 according to Embodiment 1 after winding. FIG. 14 is a plan view of the C-shaped stator 41 according to Embodiment 1 after winding. FIG. 15 is a perspective view of the stator 41 annularly shaped according to Embodiment 1 after winding. FIG. 16 is a flowchart indicating a manufacturing method of the stator 41 according to Embodiment 1. FIG. 17 is a plan view of an insulator 43*a* of the stator 41 according to Embodiment 1. FIG. 18 is a perspective view illustrating a method of laying connecting wires 80 of the stator 41 according to Embodiment 1. FIG. 19 is a perspective view illustrating a process of performing winding at the stator 41 according to Embodiment 1. FIG. 20 is a schematic explanatory view illustrating a process of performing winding at a stator 71 of a comparative example. FIG. 21 is a sectional view of the insulator 43*a* of the stator 41 according to Embodiment 1. FIG. 22 is a partially-enlarged perspective view of the stator 41 according to Embodiment 1. FIG. 23 is a sectional view of an upper portion of the stator 41 that is taken along an up-down direction at a portion of the stator 41 that is indicated by an arrow B in FIG. 22. FIG. 24 is a sectional view of the upper portion of the stator 41 that is taken along the up-down direction at a portion of the stator 41 that is indicated by an arrow C in FIG. 22. FIG. 25 is a plan view illustrating the process of performing winding at the stator 41 according to Embodiment 1. FIG. 26 is a sectional view of another configuration of insulators 43*a* and 43*b* in the stator 41 according to Embodiment 1. It should be noted that although FIGS. 17 and 21 and FIGS. 23 to 26 illustrate the insulator 43*a* only, the insulator 43*b* has the same configuration as the insulator 43*a*.

Next, the configuration of the stator 41 will be described in detail. As illustrated in FIGS. 5, 6, and 17, the stator iron cores 42 are provided with the insulators 43*a* and 43*b* that insulate the stator iron cores 42 from the windings 44. The insulators 43*a* are provided on the upper sides of the stator iron cores 42. The insulators 43*b* are provided on the lower sides of the stator iron cores 42. Back yokes 45 are fixed to an inner circumferential surface of the hermetically sealed container 10, and extend in a circumferential direction of the hermetically sealed container 10. Teeth 46 protrude inwardly in the radial direction from the centers of inner circumferential surfaces of the respective back yokes 45 in the circumferential direction. The windings 44 are wound around the teeth 46 through the insulators 43*a* and 43*b*. As illustrated in FIGS. 17, 18, and 22, the insulators 43*a* and 43*b* include end-face insulating portions 43*a*1 and 43*b*1, inner flange portions 43*a*2 and 43*b*2, and outer flange portions 43*a*3 and 43*b*3, respectively. The end-face insulating portions 43*a*1 and 43*b*1 cover end faces of the stator iron cores 42 in the axial direction. The inner flange portions 43*a*2 and 43*b*2 project from inner-circumferential-side end portions of the end-face insulating portions 43*a*1 and 43*b*1, respectively, toward circumferentially opposite sides, and extend in the axial direction away from the stator iron cores 42. The outer flange portions 43*a*3 and 43*b*3 project from outer-circumferential-side end portions of the end-face insulating portions 43*a*1 and 43*b*1, respectively, toward circumferentially opposite sides, and extend in the axial direction away from the stator iron cores 42. The windings 44 are three windings 44 that are wound for respective U-, V-, and W-phases, and are wound continuously around a plurality of teeth 46. Therefore, as illustrated in FIG. 18, the connecting wires 80 that connects the teeth 46 are laid along surfaces on the outer circumferential side of the outer flange portions 43*a*3 and 43*b*3 of the insulators 43*a* and 43*b*.

The outer flange portions 43*a*3 and 43*b*3 protrude inwardly in the radial direction relative to the stator iron core 42. The outer flange portions 43*a*3 and 43*b*3 have, on their outer circumferential surfaces (surfaces located opposite to the rotation shaft 21), set portions 50 on which the connecting wires 80 extending from the windings 44 are set. Furthermore, as illustrated in FIG. 19, the outer flange portions 43*a*3 and 43*b*3 have, on the inner circumferential surfaces (surfaces located opposite to the rotation shaft 21), recessed insulator portions 49 that are curved surfaces gradually deeper from circumferentially opposite ends toward the center in the circumferential direction. Since the recessed insulator portions 49 are formed curvedly, formability of the insulators 43*a* and 43*b* at the time of forming the insulators 43*a* and 43*b* by injection molding can be improved, as compared with the case where the recessed insulator portion 49 are formed in the shape of a square recess. As illustrated in FIG. 17, the recessed insulator portion 49 has a width W1 in the circumferential direction that is greater than a width W2 of each of the end-face insulating portions **43*a*1 and 43*b*1 in the circumferential direction and smaller than a width W3 of each of the outer flange portions 43*a*3 and 43*b*3** in the circumferential direction.

Where an end portion of the recessed insulator portion 49 that is far from the stator iron core 42 in the axial direction is a first end portion E1, and an end portion of each of the inner flange portions **43*a*2 and 43*b*2 that is far from the stator iron core 42 in the axial direction is a second end portion E2, as illustrated in FIG. 21, the first end portion E1 is farther from the stator iron core 42 than the second end portion E2. Where an end portion of the recessed insulator portion 49 that is closer to the stator iron core 42 in the axial direction is a third end portion E3, and the third end portion E3 is closer to the stator iron core 42 than the second end portion E2 of each of the inner flange portions 43*a*2 and 43*b*2. A stepped portion G is formed at a boundary between the third end portion E3 of the recessed insulator portion 49 and the inner circumferential surface of the outer flange portions 43*a*3 and 43*b*3**.

As illustrated in FIG. 6, the stator core 40 includes a plurality of stator iron cores 42. The stator iron cores 42 are divided cores and each includes the tooth 46 and the back yoke 45. The stator iron cores 42 are plate-like core pieces formed of magnetic material. The teeth 46 are formed in such a manner as to protrude toward the rotation shaft 21. The plurality of stator iron cores 42 are connected annularly, thereby forming the stator core 40.

The stator iron cores 42 are made up of first core parts 61 and second core parts 62. As illustrated in FIG. 7, the first core parts 61 are a plurality of core pieces continuously arranged through end faces **60*c* and 60*d*. As illustrated in FIG. 8, the second core parts 62 are a plurality of core pieces continuously arranged through the end faces 60*c* and 60*d*. Each of the core pieces of the first core parts 61 has a stator iron core protruding portion 60*a* and a stator iron core recessed portion 60*b* (see FIG. 9) formed on top and back sides of a one-end-side edge portion as coupling means (that is, a coupling mechanism). Each of the core pieces of the second core parts 62 has the stator iron core protruding portion 60*a* and the stator iron core recessed portion 60*b* (see FIG. 9) formed on top and back sides of the other-end-side edge portion as coupling means (that is a coupling mechanism). The stator iron core recessed portions 60*b* of the first core part 61 and the second core part 62 are formed on the back side of the stator iron core protruding portions 60*a* as illustrated in FIG. 9. On one end side of each of the first core part 61 and the second core part 62, the end face 60*c* is formed in the shape of a protruding arc around the stator iron core protruding portion 60*a* and the stator iron core recessed portion 60*b*. On the other end side of each of the first core part 61 and the second core part 62, the end face 60*d* is formed in the shape of a recessed arc that can be fitted to the end face 60*c*** of an associated adjacent core piece.

As illustrated in FIG. 9, the first core parts 61 and the second core parts 62 are alternately laminated such that positions located between the core pieces of the first core parts 61 (that is, positions located between the stator iron core protruding portions **60*a* and the stator iron core recessed portions 60*b*) are shifted in the longitudinal direction (the lateral direction in FIG. 9) from positions located between the core pieces of the second core parts 62 (that is, the positions between the stator iron core protruding portions 60*a* and the stator iron core recessed portions 60*b*), and edge portions of the core pieces that are adjacent to each other in a lamination direction in which the core pieces are laminated overlap with each other. The edge portions of the core pieces that are adjacent to each other in the lamination direction are rotatably coupled with each other, since the stator iron core protruding portions 60*a* and the stator iron core recessed portions 60*b* at the one-end-side edge portions of the core pieces of the first core parts 61 are fitted to the stator iron core protruding portions 60*a* and the stator iron core recessed portion 60*b* at the other-end-side edge portions of the core piece of the second core part 62**.

The stator iron cores 42, at the edge portions of the core pieces adjacent to each other in the lamination direction, are rotatably coupled with each other, since the stator iron core protruding portions **60*a* and the stator iron core recessed portions 60*b* at the one-end-side edge portions of the core pieces of the first core parts 61 are fitted to the stator iron core protruding portions 60*a* and the stator iron core recessed portions 60*b* at the other-end-side edge portions of the core piece of the second core parts 62. Furthermore, as illustrated in FIG. 10, the stator iron cores 42 are open at stator circumferential end portions 52 and 53. Thus, it is possible to vary the widths of slot openings 54 that are spacings between inner circumferential portions of adjacent teeth 46 of the stator iron cores 42**.

Next, the manufacturing method of the stator 41 will be described with reference to FIG. 16.

First, a winding process of performing winding is carried out. In the winding process, the plurality of stator iron cores 42 connected annularly are arranged in a C-shape that is open at one point, whereby the spacings between the teeth 46 are increased, and winding is simultaneously wound around a plurality of adjacent teeth, using a plurality of winding nozzles 90.

Specifically, as illustrated in FIGS. 10 and 11, prior to the winding, the stator core 40 is deformed to have a C-shape and is fixed, such that slot openings 54 that are the spacings between inner circumferential portions of a plurality of teeth 46 (three teeth 46 in FIGS. 10 and 11) around which windings 44 are to be wound and inner circumferential portions of teeth 46 adjacent to the above teeth 46 are widened relative to slot openings 54 that are the spacings between inner circumferential portions of the other teeth 46 adjacent to each other (step S1 in FIG. 16).

Next, as illustrated in FIG. 14, the winding nozzles 90 are inserted from the widened slot openings 54, and the windings 44 are wound around the plurality of adjacent teeth 46 (the three teeth 46 in FIGS. 10 and 11). Each of these slot openings 54 has a width that is greater than or equal to the outside diameter of each of the winding nozzles 90 that is greater than or equal to the diameter of each of the windings 44×1.5+0.6 mm. After the windings 44 are wound around the plurality of adjacent teeth 46, the stator is brought into a state illustrated in FIG. 13 (step S2 in FIG. 16).

It should be noted that in the winding process of step S2 in FIG. 16, in the case of winding windings 44 that are to be in contact with portions of the insulators **43*a* and 43*b* that are located opposite to the back yokes 45, the winding nozzles 90 are made to pass through the recessed insulator portions 49. Thus, the windings 44 can be brought into tight contact with the above portions of the insulators 43*a* and 43*b* that are located opposite to the back yokes 45**, thereby improving winding density.

The improvement of the winding density will be described in detail. FIG. 19 illustrates the back yokes 45 and the insulators **43*a* and 43*b* according to Embodiment 1. The recessed insulator portions 49 are formed at respective inner circumferential surfaces of the outer flange portions 43*a*3 and 43*b*3 of the insulators 43*a* and 43*b*. In contrast, FIG. 20** illustrates the back yokes 45 and the insulators 43*a* in a comparative example. No recessed insulator portions 49 are formed at the outer flange portions 43*a*3 and 43*b*3 of the insulators 43*a* and 43*b*.

In the manufacturing method of the stator 41 as illustrated in FIG. 19 and FIGS. 22 to 25, that is, in the manufacturing method of the stator 41 according to Embodiment 1, the windings 44 to be in contact with the portions of the insulators 43*a* and 43*b* that are located opposite to the back yokes 45 are wound such that the distal ends of the winding nozzles 90 pass through the inside of the recessed insulator portion 49, while laying the windings 44 led out from the distal ends of the winding nozzles 90, along the stepped portion G. It is therefore possible to bring the windings 44 into tight contact with the portions of the insulators 43*a* and 43*b* that are located opposite to the back yokes 45, thereby improving the winding density.

The improvement of the winding density will be described in further detail. As illustrated in FIG. 24, the windings 44 are wound after the distal end of the winding nozzle 90 passes through the inside of the recessed insulator portion 49, while laying the winding 44 led out from the distal end of the winding nozzle 90, along the stepped portion G, such that the distal end of the winding nozzle 90 is located closer to the stator iron core 42 than the first end portion E1 and farther from the stator iron core 42 than the second end portion E2. Therefore, as compared with the case where the winding 44 is wound after the distal end of the winding nozzle 90 is moved to a position farther from the stator iron core 42 than the first end portion E1, the length of part of the winding 44 from the distal end of the winding nozzle 90 to the insulators 43*a* and 43*b* is reduced. As a result, it is possible to more appropriately bring the winding 44 into tight contact with the portions of the insulators 43*a* and 43*b* that are located opposite to the back yokes 45.

It should be noted that as illustrated in FIG. 24, unless a recess depth D of the recessed insulator portion 49 (a length of the recessed insulator portion 49 in the direction length) is greater than or equal to the diameter of the winding 44×1.5, it is not possible to bring the winding 44 into tight contact with the portions of the insulators 43*a* and 43*b* that are located opposite to the back yokes 45, even though the distal end of the winding nozzle 90 is made to pass through the inside of the recessed insulator portion 49. Therefore, the recess depth D of the recessed insulator portion 49 is set greater than or equal to the diameter of the winding 44×1.5. It should be noted that the insulator 43*b* is formed to have the same configuration as the insulator 43*a* as described above, and its description will thus be omitted.

As illustrated in FIG. 24, unless the distance between the third end portion E3 of the recessed insulator portion 49 that is closer to the stator iron core 42 in the axial direction and the end-face insulating portions 43*a*1 and 43*b*1 (that is, the height H of the stepped portion G) is greater than or equal to the diameter of the winding 44, the winding 44 cannot be laid along the stepped portion G even though the distal end of the winding nozzle 90 is located in the recessed insulator portion 49. That is, the winding 44 cannot be brought into tight contact with the portions of the insulators 43*a* and 43*b* that are located opposite to the back yokes 45. Therefore, the height H of the stepped portion G is set greater than or equal to the diameter of the winding 44. It should be noted that in Embodiment 1, although the insulators 43*a* and 43*b* are formed such that the height H of the stepped portion G is equal to the diameter of the winding 44×3 as Illustrated in FIG. 24, this is not limiting. As illustrated in FIG. 26, as another configuration in Embodiment 1, the insulators 43*a* and 43*b* may be formed such that the height H of the stepped portion G is equal to the diameter of the winding 44.

In such a manner as described above, the length D of the recessed insulator portion 49 in the radial direction is set greater than or equal to the diameter of the winding 44×1.5. It is therefore possible for a person to visually confirm the winding state of the winding 44 with ease through a space between the recessed insulator portion 49 and the winding 44, and thus to easily confirm the quality of the winding 44.

The distance between the end-face insulating portions 43*a*1 and 43*b*1 and the third end portion E3 of the recessed insulator portion 49 that is closer to the stator iron core 42 in the axial direction than the other end portions is set greater than or equal to the diameter of the winding 44. As a result, while an adequate strength is maintained at part of the outer flange portions 43*a*3 and 43*b*3 that is close to the stator iron core 42, the person can visually confirm the winding state of the winding 44 through the space between the recessed insulator portion 49 and the winding 44.

As illustrated in FIG. 25, at the inner circumferential surface of the outer flange portions 43*a*3 and 43*b*3, the recessed insulator portion 49 is a curved surface that gradually becomes deeper from opposite ends in the circumferential direction toward the center in the circumferential direction. Thus, when the distal end of the winding nozzle 90 is made to pass through the inside of the recessed insulator portion 49 along the curve of the recessed insulator portion 49, the winding 44 led out from the distal end of the winding nozzle 90 can be more easily laid along the stepped portion G.

In addition, since the recessed insulator portion 49 is provided, it is possible for the person to visually confirm the winding state of the winding 44 through the space between the recessed insulator portion 49 and the winding 44, and thus to easily confirm the quality of the winding 44.

In contrast, in the manufacturing method of the comparative example as illustrated in FIG. 20, in the case of winding the winding 44 to be in contact with portions of the insulators 43*a* and 43*b* that are opposite to the back yokes 45, the winding nozzle 90 is moved along a surface of an insulator 43*a* that is not recessed. Therefore, the winding is wound in a loosened state around the portions of the insulators 43*a* and 43*b* that are opposite to the back yokes 45, as a result of which the winding density is reduced, as compared with the case illustrated in FIG. 19.

Next, when the winding nozzles 90 are moved from the teeth 46 on which the winding has been finished to subsequent teeth 46, the opened part of the single body into which the stator iron cores 42 are connected to combine is closed to form into an annular shape. Then, after the winding nozzles 90 are moved and the connecting wires 80 are laid along the set portions 50, the connecting wire step of moving the winding nozzles 90 to the subsequent teeth 46 is carried out.

Specifically, after the windings 44 are wound, the shape of the stator iron cores 42 is changed from the C-shape illustrated in FIGS. 13 and 14 to the annular shape illustrated in FIGS. 5 and 15, and the stator iron cores 42 are fixed and kept annularly (step S3 in FIG. 16). Thereafter, the winding nozzles 90 are moved along the surfaces at the outer circumferential sides of the insulators 43*a* and 43*b* and the connecting wires 80 are set along the outer circumferential sides of the insulators 43*a* and 43*b* (see FIG. 18) (in step S4 in FIG. 16).

Next, after the connecting wires 80 are set, the stator iron cores 42 are re-deformed from the annular shape illustrated in FIGS. 5 and 15 to the C-shape illustrated in FIGS. 13 and 14 and are then fixed. Thereafter, the winding 44 are wound around a plurality of adjacent teeth 46 not yet subjected to the winding.

After the connecting wire step ends, the winding step and the connecting wire step are alternately repeated a predetermined number of times (step S5 in FIG. 16). After the winding 44 are wound around all the teeth 46 and the connecting wires 80 are set (YES in step S5 in FIG. 16), the winding step and the connecting wire step are completed.

In such a manner as described above, in the stator 41 of the electric motor 30 according to Embodiment 1, one part of a single body into which the stator iron cores 42 are connected to combine can be opened and C-shaped, and the winding 44 can be wound in a state in which the slot openings 54 that are the spacings between the inner circumferential portions of adjacent teeth 46 are increased in width. Thus, the range of movement of the winding nozzles 90 is increased, and the winding density is improved. Furthermore, a plurality of adjacent teeth 46 are simultaneously wound using the plurality of winding nozzles 90, thereby reducing the time required for the winding. In the case where the diameter of the winding is large, the outer diameter of the winding nozzle 90 is thus large. In this case, it is necessary to increase the width of the slot openings 54. However, in the stator 41 according to Embodiment 1, since the opened state of the one part of the single body into which the stator iron cores 42 are combined can easily be changed, even if the diameter of the winding is increased, it is possible to deal with such a change. When the winding 44 to be in contact with the portions of the insulators 43*a* and 43*b* that are opposite to the back yokes 45 is wound, the distal end of the winding nozzle 90 is made to pass through the inside of the recessed insulator portion 49, while the winding 44 led out from the distal end of the winding nozzle 90 is being laid along the stepped portion G. It is therefore possible to bring the winding 44 into tight contact with the portions of the insulators 43*a* and 43*b* that are opposite to the back yokes 45, thus improving the winding density.

In contrast, at the time of setting the connecting wires 80, it is possible to easily form the single body into which the stator iron cores 42 are connected to combine, into an annular shape by closing the opened part of the single body. Since the connecting wires 80 are laid along the annular shape, it is therefore possible to reduce the likelihood that the connecting wires 80 will be loosened.

The manufacturing method of the stator 41 according to Embodiment 1 is a manufacturing method of a stator 41 that includes: a stator core 40 including a plurality of divided cores that are connected annularly and include respective back yokes 45 and teeth 46, the back yokes 45 being fixed to an inner circumferential surface of a container having a cylindrical shape and extending in a circumferential direction of the container, the teeth 46 protruding inwardly from inner circumferential surfaces of the back yokes 45 in the radial direction; a winding 44 wound around the teeth 46 of the divided cores; and insulators 43*a* and 43*b* isolating the divided cores from the winding 44. The insulators 43*a* and 43*b* have: respective end-face insulating portions 43*a*1 and 43*b*1 that cover end faces of the divided cores in an axial direction of the container; respective inner flange portions 43*a*2 and 43*b*2 projecting in the circumferential direction from respective inner-circumferential-side end portion of the end-face insulating portions 43*a*1 and 43*b*1, and extending in the axial direction away from the divided cores; and respective outer flange portions 43*a*3 and 43*b*3 projecting in the circumferential direction from respective outer-circumferential-side end portion of the end-face insulating portions 43*a*1 and 43*b*1, and extending in the axial direction away from the divided cores, each of the outer flange portions 43*a*3 and 43*b*3 having, on its outer circumferential surface, an set portion 50 on which a connecting wire 80 extending from the winding 44 is set, and having on its inner circumferential surface, a recessed insulator portion 49 having a recess, in which the recessed insulator portion 49 has a width in the circumferential direction that is greater than the width of the end-face insulating portions 43*a*1 and 43*b*1 in the circumferential direction, and smaller than the width of the outer flange portions 43*a*3 and 43*b*3 in the circumferential direction. A first end portion E1 is farther from the divided core than a second end portion E2, where the first end portion E1 is one of end portions of the recessed insulator portion 49 that is farther from the divided core in the axial direction than the other end portion thereof, and the second end portion E2 is one of end portions of each of the inner flange portions 43*a*2 and 43*b*2 that is farther from the divided core in the axial direction than the other portion thereof. A third end portion E3 is closer to the divided core than the second end portion E2, where the third end portion E3 is one of end portions of the recessed insulator portion 49 that is closer to the divided core in the axial direction than the above one end portion thereof. The third end portion E3 is closer to the divided core than the second end portion E2. A stepped portion G is provided at a boundary between the third end portion E3 and an inner circumferential surface of the outer flange portions 43*a*3 and 43*b*3. The manufacturing method includes: performing winding simultaneously on adjacent ones of the teeth 46, using a plurality of winding nozzles 90, after opening one part of a single body into which the divided cores are connected annularly to combine, such that the single body is C-shaped, thereby increasing distances between distances between the teeth 46; and laying the connecting wire, in the laying the connecting wire, each of the winding nozzles 90 is moved from one of the teeth 46 that is subjected to winding to a subsequent one of the teeth 46, after the opened part of the single body in which the divided cores are connected is closed such that the single body is circularly shaped, and then the winding nozzle 90 is moved and the connecting wire 80 is laid over the set portion 50. In the manufacturing method, the performing winding and the laying the connecting wire are alternately repeated, and in the performing winding, the winding 44 to be in contact with portions of the insulators 43*a* and 43*b* that are located opposite to the back yokes 45 is wound such that a distal end of the winding nozzle 90 is caused to pass through an inside of the recessed insulator portion 49, while the winding 44 led out from the distal end of the winding nozzle 90 is being laid over the stepped portion G.

In the manufacturing method of the stator 41 according to Embodiment 1, in the process of performing winding, windings are wound around adjacent ones of the teeth 46 simultaneously using the winding nozzles 90, in a state in which the single body in which the divided cores are connected is opened at one portion and is C-shaped, whereby time required for the winding can be reduced, and in the process of setting a connecting wire, the connecting wire is laid after the single body in which the divided cores are connected is closed to be shaped circularly, whereby it is possible to reduce the likelihood that the connecting wire 80 will loose. In the case of winding the winding 44 to be in contact with portions of the insulators 43*a* and 43*b* that are located opposite to the back yokes 45, the distal end of the winding nozzle 90 is made to pass through the inside of the recessed insulator portion 49, while the winding 44 led out from the distal end of the winding nozzle 90 is being laid over the stepped portion G. It is therefore possible to bring the winding 44 into tight contact with the portions of the insulators 43*a* and 43*b* that are located opposite to the back yokes 45, thereby improving the winding density.

In the manufacturing method of the stator 41 according to Embodiment 1, the recessed insulator portion 49 is a curved surface that gradually becomes deeper from the opposite ends in the circumferential direction toward the center in the circumferential direction on the inner circumferential surface of the outer flange portions 43*a*3 and 43*b*3.

In the manufacturing method of the stator 41 according to Embodiment 1, since the recessed insulator portion 49 is formed into a curved shape, formability of the insulators 43*a* and 43*b* to be formed by injection molding can be improved, as compared with the case where the recessed insulator portion 49 is formed in the shape of a square recess.

In the manufacturing method of the stator 41 according to Embodiment 1, the length D of the recessed insulator portion 49 in the radial direction is formed greater than or equal to the diameter of the winding 44×1.5, and the distance between the third end portion E3 and the end-face insulating portions 43*a*1 and 43*b*1 is set greater than or equal to the diameter of the winding 44.

In the manufacturing method of the stator 41 according to Embodiment 1, the length D of the recessed insulator portion 49 *c* is set greater than or equal to the diameter of the winding 44×1.5. As a result, the person can easily visually check a winding state of the winding 44 through a space between the recessed insulator portion 49 and the winding 44, and can thus easily check the quality of the winding 44. In addition, the distance between the third end portion E3 and the end-face insulating portions 43*a*1 and 43*b*1 is set greater than or equal to the diameter of the winding 44. This configuration enables the person to visually check the winding state of the winding 44 through the space between the recessed insulator portion 49 and the winding 44, while an adequate strength is maintained at portions of the outer flange portions 43*a*3 and 43*b*3 that are close to the stator iron core 42.

Embodiment 2

Hereinafter, Embodiment 2 will be described. However, regarding Embodiment 2, descriptions that have already been made regarding Embodiment 1 will not be re-made, and components that are the same as or equivalent to those in Embodiment 1 will be denoted by the same reference signs.

A manufacturing method of the stator 41 according to Embodiment 2 will be described below.

In the manufacturing method of the stator 41 according to Embodiment 2, at boundary portions between the back yokes 45 and the teeth 46 of the stator iron cores 42, the back yokes 45 and the teeth 46 form a right angle. In this regard, the manufacturing method of the stator 41 according to Embodiment 2 is different from the manufacturing method of the stator 41 according to Embodiment 1.

Next, the configuration of the stator 41 will be described in detail. As illustrated in FIGS. 5, 6, and 17, the winding 44 is wound around the teeth 46 extending from the back yokes 45 toward the inner circumferential side of the stator 41, through the insulators 43*a* and 43*b*. As illustrated in FIGS. 17, 18, and 22, the insulators 43*a* and 43*b* include the end-face insulating portions 43*a*1 and 43*b*1, the inner flange portions 43*a*2 and 43*b*2, and the outer flange portions 43*a*3 and 43*a*b, respectively. The end-face insulating portions 43*a*1 and 43*b*1 cover end faces of the stator iron cores 42 in the axial direction. The inner flange portions 43*a*2 and 42*b*2 project from inner-circumferential-side end portions of the end-face insulating portions 43*a*1 and 43*b*1, respectively, toward opposite sides in the circumferential direction, and extend in the axial direction away from the stator iron cores 42. The outer flange portions 43*a*3 and 43*b*3 project from outer-circumferential-side end portions of the end-face insulating portions 43*a*1 and 43*b*1, respectively, in the circumferential direction, and extend in the axial direction away from the stator iron cores 42. The winding 44 is made up of three windings 44 to be wound for respective U-, V-, and W-phases, and is wound continuously around the plurality of teeth 46. Therefore, as illustrated in FIG. 18, the connecting wires 80 that connect the teeth 46 are arranged along surfaces on the outer circumferential side of the outer flange portions 43*a*3 and 43*b*3 of the insulators 43*a* and 43*b*.

The outer flange portions 43*a*3 and 43*b*3 protrude toward the axial direction relative to the stator iron cores 42. Each of the outer flange portions 43*a*3 and 43*b*3 has, on its outer circumferential surface (that is located opposite to the rotation shaft 21), the set portions 50 on which the connecting wires 80 extending from the winding 44 are set. Furthermore, as illustrated in FIG. 19, each of the outer flange portions 43*a*3 and 43*b*3 has, on its inner circumferential surface (that faces the rotation shaft 21), the recessed insulator portion 49 that is a curved surface gradually deeper from opposite ends in the circumferential direction toward the center in the circumferential direction. Since the recessed insulator portion 49 is formed into a curved shape, formability of the insulators 43*a* and 43*b* to be formed by injection molding can be improved, as compared with the case where the recessed insulator portion 49 is formed in the shape of a square recess. As illustrated in FIG. 17, the recessed insulator portion 49 has the width W1 in the circumferential direction that is greater than the width W2 of the end-face insulating portions 43*a*1 and 43*b*1 in the circumferential direction, and smaller than the width W3 of the outer flange portions 43*a*3 and 43*b*3 in the circumferential direction.

In the stator 41 of the electric motor 30 according to Embodiment 2, the stator iron cores 42, in which the back yokes 45 and the teeth 46 forms a right angle at the boundary portions between the back yokes 45 and the teeth 46, include the outer flange portions 43*a*3 and 43*b*3 extending in the axial direction away from the stator iron cores 42. Each of the outer flange portions 43*a*3 and 43*b*3 has, on its outer circumferential surface (that is located opposite to the rotation shaft 21), the set portion 50 on which the connecting wires 80 extending from the winding 44 are set. Furthermore, each of the outer flange portions 43*a*3 and 43*b*3 has, on its inner circumferential surface (that faces the rotation shaft 21), the recessed insulator portion 49 that is a curved surface gradually deeper from the opposite ends in the circumferential direction, toward the center in the circumferential direction. The stator iron cores 42 are provided with the insulators 43*a* and 43*b*. The winding 44 is wound around the teeth 46 extending from the back yokes 45 toward the inner circumferential side of the stator 41, through the Insulators 43*a* and 43*b*.

Due to this configuration, even when the stator iron cores 42, in which the back yokes 45 and the teeth 46 form a right angle at the boundary portions between the back yokes 45 and the teeth 46, are used, it is still possible to wind the winding 44 such that the distal end of the winding nozzle 90 is made to pass through the inside of the recessed insulator portion 49, while the winding 44 led out from the distal end of the winding nozzle 90 is being laid over the stepped portion G. As a result, it is possible to bring the winding 44 into contact with portions of the insulators 43*a* and 43*b* that are located opposite to the back yokes 45.

In Embodiment 2, it is possible to use the stator iron cores 42 in which the back yokes 45 and the teeth 46 form a right angle at the boundary portions between the back yokes 45 and the teeth 46, thus reducing an iron loss. It is therefore possible to achieve a high-efficiency electric motor 30. It should be noted that in the related art, the back yokes 45 and the teeth 46 do not form a right angle at the boundary portions between the back yokes 45 and the teeth 46, that is, the boundary portions are formed in the shape of a circular arc, since it is necessary to ensure a path for winding by the winding nozzle 90.

In the manufacturing method of the stator 41 according to Embodiment 2 as described above, the back yokes 45 and the teeth 46 form a right angle at the boundary portions between the back yokes 45 and the teeth 46.

In the manufacturing method of the stator 41 according to Embodiment 2, since the back yokes 45 and the teeth 46 form a right angle at the boundary portions between the back yokes 45 and the teeth 46, thus reducing an iron loss. It is therefore possible to achieve a high-efficiency electric motor 30.

It should be noted that in Embodiments 1 and 2, the stator iron cores 42 have nine teeth 46, and the winding 44 is wound around three adjacent ones of teeth 46 using three winding nozzles 90; however, this is not limiting. Even in other configurations regarding a combination of the number of teeth 46 and the number of winding nozzles 90 (for example, even in the case where the number of teeth 46 is 3n (n≥2) and the number of winding nozzles 90 is 3n (n≥1), it is possible to obtain the same advantages as in Embodiments 1 and 2.

REFERENCE SIGNS LIST

10: hermetically sealed container, 11: upper container, 12: lower container, 20: compression mechanism, 21: rotation shaft, 21*a*: main shaft portion, 21*b*: eccentric shaft portion, 21*c*: sub-shaft portion, 22: rolling piston, 23: cylinder, 23*a*: cylinder chamber, 23*b*: back pressure chamber, 23*c*: vane groove, 24: upper bearing, 25: lower bearing, 26: vane, 27: discharge muffler, 30: electric motor, 31: rotor, 32: rotor ion core, 33: magnet insertion hole, 34: permanent magnet, 35: air hole, 40: stator core, 41: stator, 42: stator iron core, 43*a*: insulator, 43*a*1: end-face insulating portion, 43*a*2: inner flange portion, 43*a*3: outer flange portion, 43*b*: insulator, 43*b*1: end-face insulating portion, 43*b*2: inner flange portion, 43*b*3: outer flange portion, 44: winding, 45: back yoke, 46: tooth, 47: power line, 48: glass terminal, 49: recessed insulator portion, 50: set portion, 52: stator circumferentially end portion, 53: stator circumferentially end portion, 54: slot opening, 60*a*: stator iron core protruding portion, 60*b*: stator iron core recessed portion, 60*c*: end face, 60*d*: end face, 61: first core part, 62: second core part, 70: stator, 71: stator, 80: connecting wire, 90: winding nozzle, 100: hermetically sealed compressor, 101: suction muffler, 101*a*: suction connection pipe, 102: discharge pipe, 103: four-way switching valve, 104: outdoor-side heat exchanger, 105: pressure reducing device, 106: indoor-side heat exchanger, 200: refrigeration cycle apparatus

The invention claimed is:

1. A manufacturing method of a stator that includes a stator core including a plurality of divided cores that are connected annularly and include respective back yokes and teeth, the back yokes being fixed to an inner circumferential surface of a container having a cylindrical shape and extending in a circumferential direction of the container, the teeth protruding inwardly from inner circumferential surfaces of the back yokes in a radial direction, a winding wound around the teeth of the divided cores, and insulators insulating the divided cores from the winding, wherein each of the insulators includes an end-face insulating portion covering an end face of an associated one of the divided cores in an axial direction of the container, an inner flange portion projecting in the circumferential direction from an inner-circumferential-side end portion of the end-face insulating portion, and extending in a direction away from the divided core in the axial direction, and an outer flange portion projecting in the circumferential direction from an outer-circumferential-side end portion of the end-face insulating portion, and extending in the axial direction away from the divided core, wherein the outer flange portion has on an outer circumferential surface of the outer flange portion, a set portion on which a connecting wire extending from the winding is set, and on an inner circumferential surface of the outer flange portion, a recessed insulator portion having a recess, and wherein the recessed insulator portion has a width in the circumferential direction that is greater than a width of the end-face insulating portion in the circumferential direction, and smaller than a width of the outer flange portion in the circumferential direction, wherein a first end portion is further form the divided core than a second end portion, where the first end portion is one of end portions of the recessed insulator portion that is farther from the divided core in the axial direction than the other end portion of the recessed insulator portion, and the second end portion is one of end portions of the inner flange portion that is further from the divided core in the axial direction than the other end portion of the inner flange portion, wherein a third end portion is closer to the divided core than the second end portion, where the third end portion is the other end portion of the recessed insulator portion that is closer to the divided core in the axial direction than the one end portion of the recessed insulator portion, and wherein a stepped portion is provided at a boundary between the third end portion and an inner circumferential surface of the outer flange portion, the manufacturing method comprising:

performing winding simultaneously on adjacent ones of the teeth, using winding nozzles, after opening one part of a single body into which the divided cores are connected annularly to combine, such that the single body is C-shaped, thereby increasing distances between the teeth; and laying the connecting wire, in the laying the connecting wire, each of the winding nozzles is moved from one of the teeth that is subjected to winding to a subsequent one of the teeth, after the opened part of the single body in which the divided cores are connected is closed such that the single body is circularly shaped and then the winding nozzle is moved and the connecting wire is laid over the set portion, wherein the performing winding and the laying the connecting wire are alternately repeated, and in the performing winding, the winding to be in contact with portions of the insulators that are located opposite to the back yokes is wound such that a distal end of the winding nozzle is caused to pass through an inside of the recessed insulator portion, while the winding led out from the distal end of the winding nozzle is being laid over the stepped portion.

2. The manufacturing method of the stator of claim 1, wherein at the inner circumferential surface of the outer flange portion, the recessed insulator portion is a curved surface that gradually becomes deeper from opposite ends in a circumferential direction toward a center in the circumferential direction.

3. The manufacturing method of the stator of claim 1, wherein at boundary portions between the back yokes and the teeth, the back yokes and the teeth form a right angle.

4. The manufacturing method of the stator of claim 1, wherein a length of the recessed insulator portion in a radial direction is set greater than or equal to a diameter of the winding×1.5, and a distance between the third end portion and the end-face insulating portion is set greater than or equal to the diameter of the winding.

5. A stator of an electric motor, the stator being manufactured by the manufacturing method of the stator of claim 1.

6. An electric motor comprising:

the stator of an electric motor of claim 5; and a rotor of an electric motor, the rotor being provided inward of the stator.

7. A hermetically sealed compressor comprising:

the electric motor of claim 6;

a compression mechanism configured to be driven by the electric motor and to compress fluid sucked from outside; and a hermetically sealed container housing the electric motor and the compression mechanism.

8. Refrigeration cycle apparatus comprising: the hermetically sealed compressor of claim 7; an outdoor-side heat exchanger; a pressure reducing device; and an indoor-side heat exchanger.

* * * * *